(12) United States Patent
Park

(10) Patent No.: US 10,847,032 B2
(45) Date of Patent: Nov. 24, 2020

(54) APPARATUS FOR INFORMING PARKING POSITION AND METHOD THEREOF

(71) Applicant: LG ELECTRONICS INC., Seoul (KR)

(72) Inventor: Jong Jin Park, Bucheon-si (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/567,678

(22) Filed: Sep. 11, 2019

(65) Prior Publication Data
US 2020/0005641 A1    Jan. 2, 2020

(30) Foreign Application Priority Data

Jun. 28, 2019 (KR) .................. 10-2019-0078148

(51) Int. Cl.
| | |
|---|---|
| *G08G 1/14* | (2006.01) |
| *G08G 1/16* | (2006.01) |
| *G06K 9/00* | (2006.01) |
| *G01C 21/36* | (2006.01) |
| *H04W 4/024* | (2018.01) |

(52) U.S. Cl.
CPC ......... *G08G 1/144* (2013.01); *G01C 21/3667* (2013.01); *G06K 9/00671* (2013.01); *G06K 9/00805* (2013.01); *G08G 1/146* (2013.01); *G08G 1/168* (2013.01); *H04W 4/024* (2018.02); *G06K 2209/15* (2013.01)

(58) Field of Classification Search
None
See application file for complete search history.

(56) References Cited

U.S. PATENT DOCUMENTS

| | | | | |
|---|---|---|---|---|
| 10,029,730 B2* | 7/2018 | Yang | ........................ | G08G 1/14 |
| 10,363,944 B1* | 7/2019 | Yu | ..................... | B60W 50/0097 |
| 2010/0219985 A1* | 9/2010 | Schofield | .................. | B60R 1/12 |
| | | | | 340/932.2 |
| 2011/0249120 A1* | 10/2011 | Bingle | ................... | H04N 5/374 |
| | | | | 348/148 |
| 2012/0224060 A1* | 9/2012 | Gurevich | .................. | B60R 1/00 |
| | | | | 348/148 |

(Continued)

FOREIGN PATENT DOCUMENTS

KR          10-1901752 B1      9/2018

*Primary Examiner* — Michael E Teitelbaum
*Assistant Examiner* — Mustafizur Rahman
(74) *Attorney, Agent, or Firm* — Birch, Stewart, Kolasch & Birch, LLP

(57) ABSTRACT

Disclosed is a parking position notification apparatus connected to a user terminal for transmitting and receiving data. The parking position notification apparatus according to an embodiment of the present disclosure includes: a camera configured to capture an image of surroundings of a vehicle; a sensor configured to sense movement route information of the vehicle; and a wireless communication processor configured to transmit the generated map data to a user terminal. According to an embodiment of the present disclosure, at least one of, for example, an autonomous driving vehicle, a user terminal or a server may be linked or fused with an artificial intelligence (AI) module, an unmanned aerial vehicle (UAV), a robot, an augmented reality (AR) device, a virtual reality (VR) device, or a device associated with 5G service.

18 Claims, 11 Drawing Sheets

(56) References Cited

U.S. PATENT DOCUMENTS

| | | | | |
|---|---|---|---|---|
| 2013/0222157 A1* | 8/2013 | Fukushima | ............ | B60Q 9/002 340/932.2 |
| 2014/0333770 A1* | 11/2014 | Baur | ........................ | B60R 1/12 348/148 |
| 2015/0161881 A1* | 6/2015 | Takemura | .......... | G06K 9/00798 348/148 |
| 2015/0203023 A1* | 7/2015 | Marti | ........................ | B60Q 1/00 340/425.5 |
| 2015/0334269 A1* | 11/2015 | Yokota | .................... | G06T 7/251 382/103 |
| 2015/0344028 A1* | 12/2015 | Gieseke | ............... | B62D 15/028 701/1 |
| 2018/0024562 A1* | 1/2018 | Bellaiche | ............... | B60W 30/12 701/26 |
| 2018/0118106 A1* | 5/2018 | You | ..................... | G06K 9/00791 |
| 2018/0188027 A1* | 7/2018 | Zhang | ................. | G06K 9/6212 |
| 2018/0260182 A1* | 9/2018 | Suzuki | ..................... | G09G 5/40 |
| 2019/0283736 A1* | 9/2019 | Watanabe | ............. | B60W 30/06 |
| 2020/0101984 A1* | 4/2020 | Takahashi | ................. | G08G 1/16 |

* cited by examiner

APPARATUS FOR INFORMING PARKING POSITION AND METHOD THEREOF

CROSS-REFERENCE TO RELATED APPLICATION

Pursuant to 35 U.S.C. § 119(a), this application claims the benefit of an earlier filing date and priority to Korean Application No. 10-2019-0078148 filed in the Republic of Korea on Jun. 28, 2019, the contents of which are incorporated by reference herein in its entirety.

BACKGROUND OF THE INVENTION

1. Field of the Invention

The present disclosure relates to a parking position notification apparatus and a method for estimating a parked position by analyzing image information shared between movement routes or adjacent vehicles after a vehicle enters a parking lot and informing the user of the estimated position.

2. Discussion of the Related Art

In this modern world, vehicles are an essential mode of transportation. However, a vehicle needs to be parked in a predetermined space for each location to which the vehicle moves due to the size of the vehicle itself. In addition, since it is very difficult to always park the vehicle in the same place, the user has to remember a parking position every time the user parks the vehicle in a parking lot. However, the user may face a difficult situation when the user does not remember the parking position because the user does not frequently park in a large parking lot found in places such as a sports stadium, a complex cultural space, a large shopping mall, and an amusement park. That is, the user may be unfamiliar to the large parking lot.

Korean Patent Registration No. 10-1901752, entitled "System and Service Method for Informing Parking Position," discloses a method for notifying a parking position in a parking lot, wherein the method includes generating a parking confirmation signal from a car, a user terminal receiving the parking confirmation signal from the car to run an application for notifying the parking position, calculating, in the running application, the parking position by using GPS signals received by the user terminal from a GPS satellite, and determining whether the user terminal is in the proximity of the parked vehicle based on the calculated parking position.

However, in the above-described method, it is not possible to use GPS signals in an area difficult to receive GPS signals, such as an underground parking garage. Even when GPS signals can be received in the underground parking garage, when the parking garage has a plurality of levels for efficient usage of a parking area, it is difficult to calculate the level of the parking garage at which the vehicle is parked by using only GPS signals providing latitude and longitude information.

Therefore, there is a shortcoming in that the user's desire to easily and accurately identify the position of the vehicle in various parking environments cannot be satisfied. Thus, there is a need for a technology that accurately notifies the parked vehicle's user of the parking position regardless of the parking environment of the parking lot, and further notifies the user of a method for arriving at the parked position of the vehicle via an optimal route.

SUMMARY OF THE INVENTION

An aspect of the present disclosure is to provide a parking position notification apparatus and method for estimating a parking position according to a movement route of a vehicle by improving a structure for providing the parking position based on GPS signals.

Features of the present disclosure will become apparent from the descriptions of aspects hereinafter with reference to the accompanying drawings. However, the present disclosure is not limited to the aspects disclosed herein but may be implemented in various different forms. The aspects are provided to make the description of the present disclosure thorough and to fully convey the scope of the present disclosure to those skilled in the art. It is to be noted that the scope of the present disclosure is defined only by the claims.

A parking position notification apparatus according to an embodiment of the present disclosure may be configured to sense a state of a vehicle to obtain a movement route, extract identification information of an immovable object in an image captured by a vehicle camera when a vehicle moves, and determine a parking position by using the obtained movement route and the extracted identification information, such that the parking position of the vehicle may be accurately provided regardless of the environment of a parking lot.

More specifically, the parking position notification apparatus according to this embodiment of the present disclosure may include: an imaging unit for capturing an image of the surroundings of the vehicle by using a camera mounted on the vehicle and providing the captured image; a sensing unit for sensing a signal associated with a state of the vehicle by using a sensor mounted on the vehicle and obtaining movement route information of the vehicle according to the sensed signal; a control unit configured to receive the image from the imaging unit to extract identification information indicated on the immovable object in the image, receive the movement route information from the sensing unit to calculate the movement route after the vehicle enters the parking lot and use the calculated movement route to determine a position of the immovable object in the image and the parking position of the vehicle, and generate map data including the parking position, the position of the immovable object, and the identification information indicated in correspondence with the position of the immovable object; and a communication unit for transmitting the map data generated from the control unit to a user terminal.

In the parking position notification apparatus according to this embodiment of the present disclosure, the control unit may receive a map of the parking lot in which the vehicle enters via the communication unit when the vehicle enters the parking lot, and the map data may be data obtained by projecting the movement route, the position of the immovable object, and the identification information of the immovable object on the parking lot map.

In the parking position notification apparatus according to this embodiment of the present disclosure, the parking position notification apparatus may further include a navigation unit for providing the map of the parking lot in which the vehicle enters, wherein the control unit may receive the parking lot map from the navigation unit when the vehicle enters the parking lot. The map data may be data obtained by projecting the movement route, the position of the immovable object and the identification information of the immovable object on the parking lot map.

In the parking position notification apparatus according to this embodiment of the present disclosure, the control unit may generate a shortest route by excluding a repeated route in the movement route after the vehicle enters the parking lot. The map data may be data including the shortest route, the position of the immovable object, and the identification information of the immovable object.

In the parking position notification apparatus according to this embodiment of the present disclosure, the parking position notification apparatus may further include an object detection unit for identifying a position of an external black box, wherein the communication unit may communicate with the external black box; the control unit may receive a black box image from the external black box, may extract, from the black box image, additional identification information indicated on an immovable object in the black box image when a license plate of the vehicle is included in the black box image, and may determine a position of the immovable object in the black box image by using the position of the external black box identified by the object detection unit; and the map data may further include the position of the immovable object in the black box image and additional identification information indicated in correspondence with the position of the immovable object in the black box image.

In the parking position notification apparatus according to this embodiment of the present disclosure, the external black box may be a black box mounted on an another vehicle including the license plate in the image captured by the imaging unit.

In the parking position notification apparatus according to this embodiment of the present disclosure, the control unit may receive the black box image from the external black box, may extract, from the black box image, additional identification information indicated on the immovable object in the image when the license plate of another vehicle including the license plate in the image captured by the imaging unit is included in the black box image, and may determine the position of the immovable object in the black box image using the position of the external black box identified by the object detection unit.

In the parking position notification apparatus according to this embodiment of the present disclosure, the control unit may receive a plurality of images from the imaging unit periodically while moving to the parking lot to extract identification information indicated on the immovable objects in the plurality of images.

In the parking position notification apparatus according to this embodiment of the present disclosure, the object detection unit may identify a position of the immovable object in the plurality of images, and the control unit may generate map data including the position of the immovable object identified by the object detection unit and the identification information indicated in correspondence with the position of the immovable object.

A parking position notification apparatus according to an embodiment of the present disclosure may be connected to a vehicle device to transmit and receive data, in which the vehicle device may include an imaging unit for capturing an image of the surroundings of a vehicle and providing the captured image, and a sensing unit for sensing a signal associated with a state of the vehicle. The parking position notification apparatus may include: a communication unit for receiving the image and the signal from the vehicle device; a control unit configured to receive the image via the communication unit to extract identification information indicated on an immovable object in the image, receive a signal associated with the state of the vehicle via the communication unit to calculate a movement route after the vehicle enters a parking lot and use the calculated movement route to determine a position of the immovable object in the image and a parking position of the vehicle, and generate map data including the parking position, the position of the immovable object, and the identification information indicated in correspondence with the position of the immovable object; and a display unit for displaying the map data generated from the control unit.

In the parking position notification apparatus according to this embodiment of the present disclosure, the control unit may receive a map of the parking lot in which the vehicle enters via the communication unit when the vehicle enters the parking lot. The map data may be data obtained by projecting the parking position, the position of the immovable object and the identification information indicated in correspondence with the position of the immovable object on the parking lot map.

In the parking position notification apparatus according to this embodiment of the present disclosure, the control unit may generate a shortest route by excluding a repeated route in the movement route after the vehicle enters the parking lot, and the map data may be data including the shortest route and the identification information of the immovable object.

A parking position notification method according to an embodiment of the present disclosure may be applied to a vehicle connected to a user terminal to transmit and receive data. The parking position notification method may include: capturing an image of the surroundings of the vehicle by using a camera mounted on the vehicle and providing the captured image; sensing a signal associated with a state of the vehicle by using a sensor mounted on the vehicle and obtaining movement route information of the vehicle according to the sensed signal; receiving the image to extract identification information indicated on an immovable object in the image, receiving the movement route information to calculate a movement route after the vehicle enters a parking lot and using the calculated movement route to determine a position of the immovable object in the image and a parking position of the vehicle, and generating map data including the parking position, the position of the immovable object, and the identification information indicated in correspondence with the position of the immovable object; and transmitting the map data to the user terminal.

A parking position notification method according to an embodiment of the present disclosure may be applied to a user terminal connected to a vehicle device to transmit and receive data. The vehicle device may include an imaging unit for capturing an image of the surrounding of a vehicle and providing the captured image, and a sensing unit for sensing a signal associated with a state of the vehicle. The parking position notification method may include: receiving the image and the signal from the vehicle device; extracting identification information indicated on an immovable object in the image received from the vehicle device, receiving a signal associated with a state of the vehicle to calculate a movement route after the vehicle enters the parking lot and using the calculated movement route to determine a position of the immovable object and a parking position of the vehicle, and generating map data including the parking position, the position of the immovable object, and the identification information indicated in correspondence with the position of the immovable object; and displaying the map data.

A non-transitory computer-readable recording medium according to this embodiment of the present disclosure may be a recording medium recording a program for notifying a parking position applied to a vehicle connected to a user terminal to transmit and receive data. The program may cause a computer to perform: capturing an image of the surroundings of the vehicle by using a camera mounted on the vehicle and providing the captured image; sensing a signal associated with a state of the vehicle by using a sensor mounted on the vehicle and obtaining movement route information of the vehicle according to the sensed signal; receiving the image to extract identification information indicated on an immovable object in the image, receiving the movement route information to calculate a movement route after the vehicle enters a parking lot and using the calculated movement route to determine a position of the immovable object in the image and a parking position of the vehicle, and generating map data including the parking position, the position of the immovable object, and the identification information indicated in correspondence with the position of the immovable object; and transmitting the map data to the user terminal.

A non-transitory computer-readable recording medium according to an embodiment of the present disclosure may be a recording medium recording a program for notifying a parking position applied to a user terminal connected to a vehicle device to transmit and receive data. The vehicle device may include an imaging unit for capturing an image of the surroundings of a vehicle and providing the captured image, and a sensing unit for sensing a signal associated with a state of the vehicle. The program may cause a computer to perform: receiving the image and the signal from the vehicle device; extracting identification information indicated on an immovable object in the image received from the vehicle device, receiving the signal associated with a state of the vehicle to calculate a movement route after the vehicle enters the parking lot and using the calculated movement route to determine a position of the immovable object and a parking position of the vehicle, and generating map data including the parking position, the position of the immovable object, and the identification information indicated in correspondence with the position of the immovable object; and displaying the map data.

The details of other embodiments may be included in the detailed description and drawings.

The embodiments of the present disclosure are not limited to those mentioned above, and other aspects and features than those described above will become apparent from the following drawings, claims, and detailed description of the present disclosure.

BRIEF DESCRIPTION OF THE DRAWINGS

The foregoing and other features of the inventive concepts will be apparent from the more detailed description of preferred embodiments as illustrated in the accompanying drawings in which like reference characters refer to the same parts throughout the different views. The drawings are not necessarily to scale with emphasis instead being placed upon illustrating the principles of the inventive concepts.

DETAILED DESCRIPTION OF THE EMBODIMENTS

Figure 1:
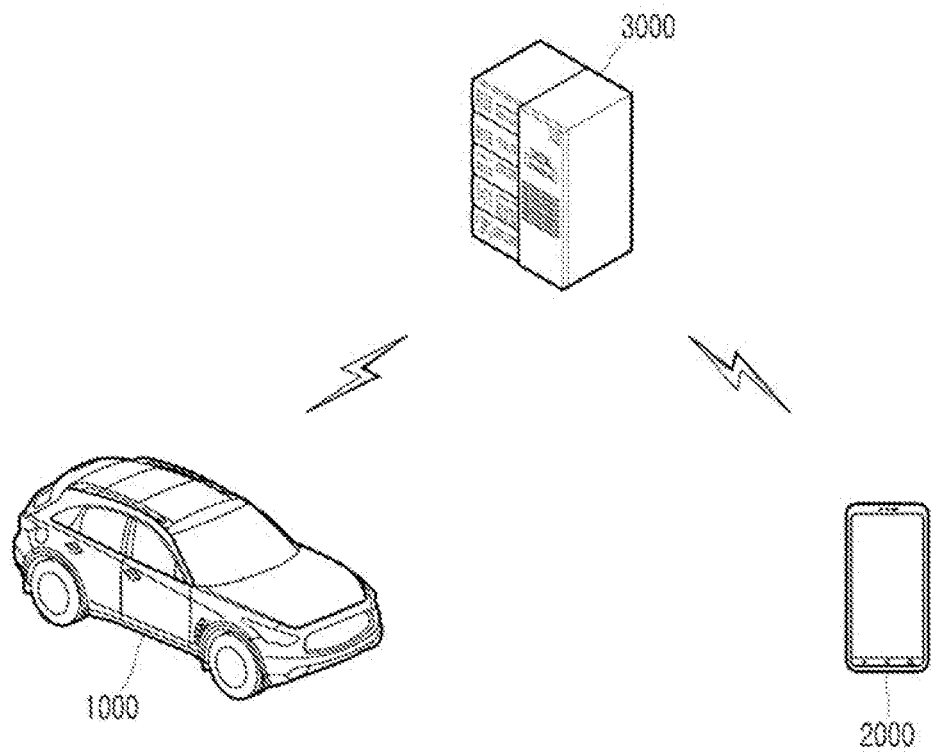
FIG. 1 is a diagram illustrating a system to which a parking position notification apparatus is applied according to an embodiment of the present disclosure.

The embodiments disclosed in the present specification will be described in greater detail with reference to the accompanying drawings, and throughout the accompanying drawings, the same reference numerals are used to designate the same or similar components and redundant descriptions thereof are omitted. In the following description, the suffixes "module" and "unit" that are mentioned with respect to the elements used in the present description are merely used individually or in combination for the purpose of simplifying the description of the present disclosure, and therefore, the suffix itself will not be used to differentiate the significance or function or the corresponding term. Also, the accompanying drawings are provided only to facilitate understanding of the embodiments disclosed in the present disclosure and therefore should not be construed as being limiting in any way. It should be understood that all modifications, equivalents, and replacements which are not exemplified herein but are still within the spirit and scope of the present disclosure are to be construed as being included in the present disclosure.

The terms such as "first," "second," and other numerical terms may be used herein only to describe various elements and only to distinguish one element from another element, and as such, these elements should not be limited by these terms. Similarly, it will be understood that when an element is referred to as being "connected", "attached", or "coupled" to another element, it can be directly connected, attached, or coupled to the other element, or intervening elements may be present. In contrast, when an element is referred to as being "directly connected", "directly attached", or "directly coupled" to another element, no intervening elements are present.

The terminology used herein is used for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "includes," "including," "containing," "has," "having" or other variations thereof are inclusive and therefore specify the presence of stated features, integers, steps, operations, elements, and/or components, but do not preclude the presence or addition of one or more other features, integers, steps, operations, elements, components, and/or groups thereof.

The vehicle described herein may be a concept including a car and a motorcycle. Hereinafter, the vehicle will be described mainly with respect to the car. The vehicle described herein may be a concept including an internal combustion engine vehicle having an engine as a power source, a hybrid vehicle having an engine and an electric motor as a power source, and an electric vehicle having an electric motor as a power source.

FIG. 1 is a diagram illustrating a system to which a parking position notification apparatus is applied according to an embodiment of the present disclosure. Referring to FIG. 1, a vehicle sharing service system may include a vehicle 1000, a user terminal 2000, and a server 3000.

According to this embodiment, the system to which the parking position notification apparatus is applied may include other components than those shown in FIG. 1, or may not include some of the components shown in FIG. 1 described hereinafter. The parking position notification apparatus according to an embodiment of the present disclosure may be mounted on the vehicle 1000 having wheels rotated by a power source and a steering input device for adjusting a traveling direction. Here, the vehicle 1000 may be an autonomous driving vehicle.

The parking position notification apparatus according to the embodiment of the present disclosure may be installed in the user terminal 2000 owned by a user of a vehicle in a parking lot. Here, the user terminal 2000 may be a portable device such as a notebook computer, a mobile phone, a Personal Digital Assistant (PDA), a smartphone, and a multimedia device, or may be a non-portable device such as a personal computer (PC) and a device mounted on a vehicle. The vehicle 1000 and the user terminal 2000 may receive information from the server 3000, information in which the server 3000 receives from another vehicle.

Figure 2:
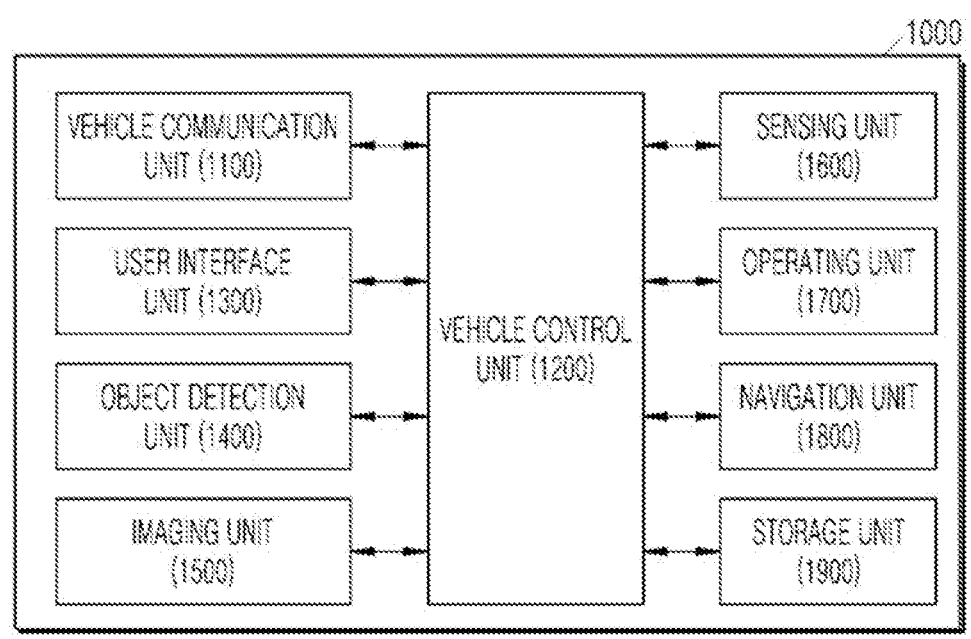
FIG. 2 is a block diagram showing a parking position notification apparatus installed in a vehicle according to an embodiment of the present disclosure.

FIG. 2 is a block diagram showing a parking position notification apparatus installed on a vehicle 1000 according to an embodiment of the present disclosure. Referring to FIG. 2, the parking position notification apparatus may include a vehicle communication unit 1100, a vehicle control unit 1200, a vehicle user interface unit 1300, an object detection unit 1400, an imaging unit 1500, a sensing unit 1600, an operating unit 1700, a navigation unit 1800, and a vehicle storage unit 1900. According to this embodiment, the system to which the parking position notification apparatus is applied may include other components than those shown in FIG. 2, or may not include some of the components shown in FIG. 2 described hereinafter.

The vehicle 1000 may be switched from an autonomous driving mode to a manual driving mode or switched from the manual driving mode to the autonomous driving mode according to a driving condition. Here, the driving condition may be determined by at least one of information received by the vehicle communication unit 1100, external object information detected by the object detection unit 1400, or navigation information obtained by the navigation unit 1800.

Further, the vehicle 1000 can be switched from the autonomous driving mode to the manual driving mode or switched from the manual driving mode to the autonomous driving mode according to a user input received via the vehicle user interface unit 1300. When the vehicle 1000 is operated in the autonomous driving mode, the vehicle 1000 can be operated under the control of the operating unit 1700 which controls driving, leaving a parking lot, and parking operations. When the vehicle 1000 is operated in the manual driving mode, the vehicle 1000 can be operated by an input via a mechanical driving operation of a driver.

In addition, the vehicle communication unit 1100 is a module for performing communication with an external device. Here, the external device may be another vehicle, the user terminal 2000, or the server 3000.

Also, the vehicle communication unit 1100 can transmit map data indicating a parking position and identification information of an immovable object to the user terminal 2000. For example, the vehicle communication unit 1100 may communicate with an external black box installed in, for example, another vehicle. In another example, the vehicle communication unit 1100 may communicate with an external black box installed in another vehicle positioned adjacent to the vehicle 1000, for example, located within a distance that enables communication by short range communication.

Further, the vehicle communication unit 1100 may include, for performing communication, at least one of a transmission antenna, a reception antenna, a radio frequency (RF) circuit capable of implementing various communication protocols, or an RF device. The vehicle communication unit 1100 can perform short range communication, GPS signal reception, V2X communication, optical communication, broadcast transmission and reception, and intelligent transport system (ITS) communication functions.

According to an embodiment, the vehicle communication unit 1100 may further support other functions in addition to the above-described functions or may not support some of the above-described functions. In addition, the vehicle communication unit 1100 may support short range communication using at least of one a wireless communication unit such as Bluetooth™, Radio Frequency Identification (RFID), Infrared Data Association (IrDA), Ultra Wideband (UWB), ZigBee, Near Field Communication (NFC), Wireless-Fidelity (Wi-Fi), Wi-Fi Direct, and Wireless Universal Serial Bus (Wireless USB) technologies.

The vehicle communication unit 1100 may also include a Global Positioning System (GPS) module or a Differential Global Positioning System (DGPS) module to obtain information on the position of the vehicle 1000. In addition, the vehicle communication unit 1100 may include a module for supporting wireless communication between the vehicle 1000 and a server (Vehicle to Infra: V2I), another vehicle (Vehicle to Vehicle: V2V), or a pedestrian (Vehicle to Pedestrian: V2P), that is, a V2X communication module. The V2X communication module may include an RF circuit capable of implementing communication with the infrastructure (V2I), communication between the vehicles (V2V), and communication with the pedestrian (V2P) protocols.

Further, the vehicle communication unit 1100 may include an optical communication module for performing communication with the external device via light. The optical communication module may include an optical transmitting module for converting an electrical signal into an optical signal to transmit the optical signal to the outside, and an optical receiving module for converting a received optical signal into an electrical signal. According to an embodiment, the optical transmitting module may be formed to be integrated with a lamp included in the vehicle 1000.

The vehicle communication unit 1100 may also include a broadcast communication module for receiving a broadcast signal from an external broadcast management server via a broadcast channel or transmitting the broadcast signal to the broadcast management server. The broadcast channel may include a satellite channel and a terrestrial channel. The broadcast signal may include a TV broadcast signal, a radio broadcast signal, and a data broadcast signal.

Further, the vehicle communication unit 1100 may include an ITS communication module for exchanging information, data, or signals with a traffic system. The ITS communication module may provide the information and the data obtained in the traffic system. The ITS communication module may receive the information, the data, or the signals from the traffic system. For example, the ITS communication module may receive road traffic information from the traffic system and provide the received road traffic information to the vehicle control unit 1200. As another example, the ITS communication module may receive a control signal from the traffic system and provide the received control signal to the vehicle control unit 1200 or a processor provided inside the vehicle 1000.

According to an embodiment, the general operation of each module of the vehicle communication unit 1100 may be controlled by a separate processor provided in the vehicle communication unit 1100. In addition, the vehicle communication unit 1100 may include a plurality of processors or may not include a processor. The vehicle communication unit 1100 may be operated under a control of a processor of other devices in the vehicle 1000 or the vehicle control unit 1200 when a processor is not included in the vehicle communication unit 1100.

Also, the vehicle communication unit 1100 can implement a display for the vehicle together with the user interface unit 1300. In this instance, the display for the vehicle may be called as a telematics device or an Audio Video Navigation (AVN) device. The vehicle communication unit 1100 can also transmit specific information to a 5G network when the vehicle 1000 is operated in the autonomous driving mode.

In this instance, the specific information may include autonomous driving related information. In more detail, the autonomous driving related information may be information directly associated with the driving control of the vehicle. For example, the autonomous driving related information may include at least one of object data indicating an object around the vehicle, map data, vehicle state data, vehicle position data, or driving plan data.

The autonomous driving related information may further include service information necessary for autonomous driving. For example, the specific information may include information about a destination and a vehicle stability level input via the user terminal 2000. In addition, the 5G network may determine whether the vehicle is remotely controlled. Herein, the 5G network may include a server or a module performing remote control associated with autonomous driving. In addition, the 5G network may transmit information or signals associated with remote control to the autonomous driving vehicle.

As mentioned above, the information associated with remote control may be a signal directly applied to the autonomous driving vehicle and may further include service information for autonomous driving. In an embodiment of the present disclosure, the autonomous driving vehicle may provide services associated with autonomous driving by receiving service information such as information about a safe or dangerous section of each selected section on a driving route via the server connected to the 5G network.

A procedure for 5G communication between the vehicle 1000 capable of autonomous driving and the 5G network, for example, an initial access procedure between the vehicle 1000 and the 5G network, will be schematically described as follows. First, an example of an application operation performed in the 5G communication system via the 5G network and the vehicle 1000 capable of autonomous driving is as follows.

The vehicle 1000 can perform the initial access procedure with the 5G network (INITIAL ACCESS STEP). In this instance, the initial access procedure can include, for example, a cell search process for obtaining downlink (DL) synchronization and a process for obtaining system information.

In addition, the vehicle 1000 can perform a random access procedure with the 5G network (RANDOM ACCESS STEP). In this instance, the random access procedure may include, for example, a process for obtaining an uplink (UL) synchronization or a preamble transmitting process for transmitting UL data and a receiving process for a random access response.

Also, the 5G network can transmit an UL grant for scheduling transmission of the specific information to the vehicle 1000 capable of autonomous driving (UL GRANT RECEIVING STEP). The procedure by which the vehicle 1000 receives the UL grant may include a scheduling process in which time and frequency resources are allocated for transmission of the UL data to the 5G network.

In addition, the vehicle 1000 capable of autonomous driving can transmit the specific information to the 5G network based on the UL grant (SPECIFIC INFORMATION TRANSMITTING STEP). Also, the 5G network may determine whether the vehicle 1000 is remotely controlled based on the specific information transmitted from the vehicle 1000 (REMOTE CONTROL DETERMINING STEP).

Furthermore, the vehicle 1000 capable of autonomous driving may receive the DL grant via a physical downlink control channel to receive a response to the specific information transmitted from the 5G network (DL GRANT RECEIVING STEP). Thereafter, the 5G network can transmit information or signals associated with remote control to the vehicle 1000 capable of autonomous driving based on the DL grant (REMOTE CONTROL RELATED INFORMATION TRANSMITTING STEP).

In addition, the procedure of combining the initial access procedure or the random access procedure and the downlink grant receiving process of the autonomous vehicle 1000 and the 5G network has been exemplarily described, but the present disclosure is not limited thereto. For example, the initial access procedure or the random access procedure may be performed through the initial access step, the UL grant receiving step, the specific information transmitting step, the vehicle remote control determining step and the remote control related information transmitting step. In addition, for example, the initial access procedure or the random access procedure may be performed through the random access step, the UL grant receiving step, the specific information transmitting step, the vehicle remote control determining step, and the remote control related information transmitting step. Further, the control of the vehicle 1000 capable of autonomous driving may be performed in a manner that combines artificial intelligence (AI) operation and DL grant receiving process through the specific information transmitting step, the vehicle remote control determining step, the DL grant receiving step, and the remote control related information transmitting step.

In addition, since the operation of the vehicle 1000 capable of autonomous driving described above is merely exemplary, the present disclosure is not limited thereto. For example, the operation of the vehicle 1000 capable of autonomous driving may be performed such that the initial access step, the random access step, the UL grant receiving step, or the DL grant receiving step is selectively combined with the information transmitting step or the remote control related information transmitting step. In addition, the operation of the vehicle 1000 capable of autonomous driving may be configured by the random access step, the UL grant receiving step, the specific information transmitting step, and the remote control related information transmitting step. Further, the operation of the vehicle 1000 capable of autonomous driving may be configured by the initial access step, the random access step, the specific information transmitting step, and the remote control related information transmitting step. In addition, the operation of the vehicle 1000 capable of autonomous driving may include the UL grant receiving step, the specific information transmitting step, the DL grant receiving step, and the remote control related information transmitting step.

The vehicle 1000 including an autonomous driving module can perform the initial access procedure with the 5G network based on a synchronization signal block (SSB) to obtain the DL synchronization and system information (INITIAL ACCESS STEP). In addition, the vehicle 1000 capable of autonomous driving can perform the random access procedure with the 5G network for the UL synchronization acquisition or the UL transmission (RANDOM ACCESS STEP).

Also, the vehicle 1000 capable of autonomous driving may receive the UL grant from the 5G network to transmit the specific information (UL GRANT RECEIVING STEP). In addition, the vehicle 1000 capable of autonomous driving can transmit the specific information to the 5G network based on the UL grant (SPECIFIC INFORMATION TRANSMITTING STEP).

Furthermore, the vehicle 1000 capable of autonomous driving may receive the DL grant from the 5G network for receiving a response to the specific information (DL GRANT RECEIVING STEP). Also, the vehicle 1000 capable of autonomous driving can receive the information or signals associated with remote control from the 5G network based on the DL grant (REMOTE CONTROL RELATED INFORMATION RECEIVING STEP).

A beam management (BM) process may be added to the initial access step, a beam failure recovery process associated with a physical random access channel (PRACH) transmission may be added to the random access step, a quasi co-located (QCL) relation may be added to the UL grant receiving step with respect to a beam receiving direction of a physical downlink control channel (PDCCH) including the UL grant, and a QCL relation may be added to the specific information transmitting step with respect to a beam transmitting direction of a physical uplink control channel (PUCCH)/physical uplink shared channel (PUCCH) including the specific information. In addition, a QCL relation may be added to the DL grant receiving step with respect to a beam receiving direction of the PDCCH including the DL grant.

Further, the vehicle 1000 capable of autonomous driving can perform the initial access procedure with the 5G network based on the SSB to obtain the DL synchronization and system information (INITIAL ACCESS STEP). In addition, the vehicle 1000 capable of autonomous driving can perform the random access procedure with the 5G network for the UL synchronization acquisition or UL transmission (RANDOM ACCESS STEP).

Furthermore, the vehicle 1000 capable of autonomous driving may transmit specific information to the 5G network based on a configured grant (UL GRANT RECEIVING STEP). That is, instead of receiving the UL grant from the 5G network, the set grant may be received.

Also, the vehicle 1000 capable of autonomous driving can receive information or signals associated with remote control from the 5G network based on the configured grant (REMOTE CONTROL RELATED INFORMATION RECEIVING STEP). Further, the vehicle 1000 capable of autonomous driving can perform an initial access procedure with the 5G network based on the SSB to obtain the DL synchronization and system information (INITIAL ACCESS STEP).

In addition, the vehicle 1000 capable of autonomous driving can perform the random access procedure with the 5G network for UL synchronization acquisition or UL transmission (RANDOM ACCESS STEP). Furthermore, the vehicle 1000 capable of autonomous driving can receive downlink (DL) preemption information element (IE) from the 5G network (DL PREEMPTION IE RECEIVING).

Also, the vehicle 1000 capable of autonomous driving can receive a downlink control information (DCI) format 2_1 including a preemption indication from the 5G network based on the DL preemption IE (DCI FORMAT 2_1 RECEIVING STEP). Further, the vehicle 1000 capable of autonomous driving may not perform, expect, or assume reception of eMBB data in the resource (PRB or OFDM symbol) indicated by the preemption indication (EMBB DATA RECEPTION NON-PERFORMING STEP). The vehicle 1000 capable of autonomous driving can also receive the UL grant in the 5G network to transmit the specific information (UL GRANT RECEIVING STEP).

Further, the vehicle 1000 capable of autonomous driving may transmit the specific information to the 5G network based on the UL grant (SPECIFIC INFORMATION TRANSMITTING STEP). In addition, the vehicle 1000 capable of autonomous driving can receive the DL grant from the 5G network for receiving a response to the specific information (DL GRANT RECEIVING STEP).

Also, the vehicle 1000 capable of autonomous driving can receive the information or signals associated with remote control from the 5G network based on the DL grant (REMOTE CONTROL RELATED INFORMATION RECEIVING STEP). The vehicle 1000 capable of autonomous driving can also perform the initial access procedure with the 5G network based on the SSB to obtain the DL synchronization and system information (INITIAL ACCESS STEP).

In addition, the vehicle 1000 capable of autonomous driving can perform the random access procedure with the 5G network for the UL synchronization acquisition or UL transmission (RANDOM ACCESS STEP). Further, the vehicle 1000 capable of autonomous driving can receive the UL grant in the 5G network to transmit the specific information (UL GRANT RECEIVING STEP).

When transmission of the specific information is repeatedly performed, the UL grant may include information on the frequency of repetition, and the specific information may be repeatedly transmitted based on the information on the frequency of repetition (SPECIFIC INFORMATION REPETITION TRANSMISSION). In addition, the vehicle 1000 capable of autonomous driving can transmit the specific information to the 5G network based on the UL grant.

In addition, the repetitive transmission of the specific information may be performed through frequency hopping, the transmission of the first specific information may be transmitted in a first frequency resource, and the transmission of the second specific information may be transmitted in a second frequency resource. The specific information may be transmitted through 6 RB (Resource Block) or 1 RB (Resource Block) narrow band.

In addition, the vehicle 1000 capable of autonomous driving can receive the DL grant from the 5G network for receiving a response to the specific information (DL GRANT RECEIVING STEP). Also, the vehicle 1000 capable of autonomous driving can receive information or signals associated with remote control from the 5G network based on the DL grant (REMOTE CONTROL RELATED INFORMATION RECEIVING STEP).

The above-mentioned 5G communication technique may be applied in combination with the embodiment proposed in this specification, which will be described later in FIG. 1 to FIG. 6D, or may be supplemented to specify or clarify the technical features of the embodiments proposed in this specification. Further, the vehicle 1000 can be connected to an external server via a communication network and be capable of moving along a predetermined route without intervention of a driver by using an autonomous driving technology.

In the following embodiments, the user can be interpreted as the driver, a passenger, or an owner of the user terminal. When the vehicle 1000 is driving in autonomous driving mode, the type and frequency of accidents may vary depending on the ability to sense surrounding risk factors in real time. A route to a destination may include different levels of risk due to various causes such as weather, terrain, and traffic.

According to the present disclosure, at least one of the autonomous driving vehicle, the user terminal, and the server are linked or fused with, for example, an artificial intelligence module, an unmanned aerial vehicle (UAV), a robot, an augmented reality (AR) device, a virtual reality (VR) device, or a device associated with 5G service.

For example, the vehicle 1000 can operate in association with at least one of an artificial intelligence module or a robot included in the vehicle 1000 during autonomous driving. As another example, the vehicle 1000 may interact with at least one robot. In more detail, the robot can be an autonomous mobile robot (AMR) capable of traveling on its own. The mobile robot can also be capable of moving freely and be equipped with a plurality of sensors to avoid obstacles while traveling. Further, the mobile robot may be a flying type robot, such as a drone, having a flight device. The mobile robot may also be a wheel type robot having at least one wheel and movement due to wheel rotation. In addition, the mobile robot may be a legged robot having at least one leg and movement by using legs.

Also, the robot can function as a device that complements user convenience. For example, the robot can perform a function of moving contents placed on the vehicle 1000 to a final destination of the user. As another example, the robot can perform a function of guiding a user who alights from the vehicle 1000 to a final destination. As still another example, the robot can perform a function of transporting a user from the vehicle 1000 to a final destination.

Further, at least one electronic device included in the vehicle 1000 can communicate with the robot via a communication device. The at least one electronic device included in the vehicle 1000 can provide, to the robot, data processed by at least one electronic device included in the vehicle. For example, at least one electronic device included in the vehicle 1000 can provide, to the robot, at least one of object data indicating an object around the vehicle, HD map data, vehicle state data, vehicle position data, or driving plan data.

The at least one electronic device included in the vehicle 1000 can receive data processed in the robot from the robot. At least one electronic device included in the vehicle 1000 can receive at least one of sensing data, object data, robot state data, robot position data, or movement plan data generated by the robot.

Further, the at least one electronic device included in vehicle 1000 can generate a control signal based further on data received from the robot. For example, at least one electronic device included in the vehicle can compare information about an object generated in the object detection device with information about an object generated by the robot, and generate a control signal based on results of the comparison. The at least one electronic device included in the vehicle 1000 can also generate the control signal so as to prevent interference between the movement route of the vehicle and the movement route of the robot.

In addition, the at least one electronic device included in the vehicle 1000 may include a software module or a hardware module (hereinafter referred to as an artificial intelligence module) that implements artificial intelligence (AI) and input an obtained data into the AI module and use data output from the AI module. Further, the AI module can perform machine learning on input data using at least one artificial neural network (ANN). The AI module may output driving plan data via the machine learning on the input data. The at least one electronic device included in the vehicle 1000 can also generate a control signal based on data output from the AI module.

According to an embodiment, the at least one electronic device included in the vehicle 1000 can receive data processed by AI from the external device via the communication device and generate a control signal based on data processed by AI. Further, the vehicle control unit 1200 can extract identification information indicated on an immovable object in an image; receive movement route information to calculate a movement route after the vehicle 1000 enters a parking lot and use the calculated movement route to determine a position of the immovable object in the image and a parking position of the vehicle 1000; and generate map data including the determined parking position, the determined position of the immovable object, and the identification information indicated in correspondence with the position of the immovable object. The vehicle control unit 1200 can also control the generated map data to be transmitted to the user terminal 2000 via the vehicle communication unit 1100.

Further, the vehicle control unit 1200 can be provided with a map of the parking lot in which the vehicle 1000 enters via the vehicle communication unit 1100 when the vehicle 1000 enters the parking lot. The vehicle control unit 1200 can also transmit information on the position of the vehicle 1000, for example, address information, to a server such as a property server having a map of property such as buildings and land in order to receive the parking lot map, via the vehicle communication unit 1100, and request a corresponding server to transmit the parking map in correspondence with the transmitted address information. The vehicle control unit 1200 can generate the map data by projecting the calculated movement route and the identification information of the immovable object on the received parking lot map.

The vehicle control unit 1200 can also generate a shortest route by excluding a repeated route in the movement route after the vehicle enters the parking lot. The vehicle control unit 1200 can generate the map data including the generated shortest route and the identification information of the immovable object. Further, the vehicle control unit 1200 can exclude the repeated route by selecting the route having the shortest distance in a direction leading to a parking position from the parking lot entrance among all the possible movement routes of the vehicle 1000 created using the movement route after the vehicle 1000 enters the parking lot.

In addition, the vehicle control unit 1200 can generate the shortest route as described above by regarding, as one way, a section where a past movement direction of the vehicle 1000 and a direction leading to the parking position from the parking lot entrance do not coincide from among the selected routes having the shortest direction, and excluding the section. The vehicle control unit 1200 can also receive a black box image from an external black box, extract the identification information indicated on the immovable object in the image when a license plate of the user's vehicle 1000 is included in the black box image, and determine the position of the immovable object in the black box image by using the position of the external black box. In this instance, the vehicle control unit 1200 can generate the map data further including the position of the immovable object in the black box image and additional identification information indicated in correspondence with the position of the immovable object in the black box image.

In addition, the vehicle control unit 1200 may be implemented using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, or other units for performing other functions.

The vehicle user interface unit 1300 can be for communication between the vehicle 1000 and the user of the vehicle. The vehicle user interface unit 1300 can receive an input signal of the user, transmit the received input signal to the vehicle control unit 1200, and provide information retained by the vehicle 1000 to the user under the control of the control unit 1200. The vehicle user interface unit 1300 may include, but is not limited to, an input module, an internal camera, a bio-sensing module, and an output module.

Further, the object detection unit 1400, for detecting an object located outside the vehicle 1000, can generate the object information based on sensing data and transmit the generated object information to the vehicle control unit 1200. In this instance, the object may include various objects associated with the operation of the vehicle 1000 such as a lane, another vehicle, a pedestrian, a motorcycle, a traffic signal, a light, a road, a structure, a speed limiter, a terrain, and an animal. The object detection unit 1400 can also identify a position of the external black box by detecting another vehicle.

In addition, the object detection unit 1400 can identify a plurality of immovable objects in an image, for example, positions of pillars in the parking lot. In this instance, the map data provided by the vehicle control unit 1200 may be identification information, for example, data arranged based on the location of the pillars in which markings indicated on the pillars in the parking lot are identified by the object detection unit 1400.

The object detection unit 1400 may also include a radar, a lidar, an ultrasonic sensor, and an infrared sensor. According to this embodiment, the object detection unit 1400 may include other components than those described below, or may not include some of the components described below.

Further, the radar may include an electromagnetic wave transmitting module and a receiving module. The radar may be implemented by a pulse radar scheme or a continuous wave radar scheme in terms of an electromagnetic wave emission principle. In addition, the radar may be implemented by a frequency modulated continuous wave (FMCW) scheme or a frequency shift keying (FSK) scheme in accordance with a signal waveform in the continuous wave radar scheme.

In addition, the radar can detect an object based on a time of flight (TOF) scheme or a phase shift scheme by means of an electromagnetic wave, and detect a location of the detected object, a distance to the object, and a relative speed with respect to the detected object. The radar may also be arranged at an appropriate location outside the vehicle to sense an object located at the front, rear, or side of the vehicle.

Further, the lidar may include a laser transmitting module and a receiving module. The lidar may be implemented in the time of flight (TOF) scheme or the phase shift scheme and implemented as either a driving type or non-driving type.

When the lidar is implemented as the driving type, the lidar can be rotated by a motor and detect an object around the vehicle 1000. In addition, when the lidar is implemented as the non-driving type, the lidar can detect an object located within a predetermined range with respect to the vehicle 1000 through optical steering. The vehicle 1000 may also include a plurality of lidars with the non-driving type.

The lidar can also detect an object based on the time of flight (TOF) scheme or the phase shift scheme by a laser beam, detect a location of the detected object, and \ detect a distance to the object and a relative speed with respect to the detected object. The lidar may also be arranged at an appropriate location outside the vehicle to sense an object located at the front, rear, or side of the vehicle.

Further, the ultrasonic sensor may include an ultrasonic transmitting module and a receiving module. Also, the ultrasonic sensor can detect an object based on the ultrasonic wave, and detect a location of the detected object, a distance to the object, and a relative speed with respect to the detected object. The ultrasonic sensor can also be arranged at an appropriate location outside the vehicle to sense an object located at the front, rear, or side of the vehicle.

In addition, the infrared sensor may include the infrared transmitting module and the receiving module. The infrared sensor can detect an object based on infrared light, and detect a location of the detected object, a distance to the object and a relative speed with respect to the detected object. The infrared sensor may also be arranged at an appropriate location outside the vehicle to sense an object located at the front, rear, or side of the vehicle.

The vehicle control unit 1200 can control the overall operation of each module of the object detection unit 1400. For example, the vehicle control unit 1200 can detect or classify objects by comparing data sensed by the radar, lidar, ultrasonic sensor, and infrared sensor, and previously stored data.

The vehicle control unit 1200 can also detect and track an object based on the obtained image. Further, the vehicle control unit 1200 can perform operations such as calculating a distance to the object and calculating a relative speed with respect to the object via an image processing algorithm. For example, the vehicle control unit 1200 can obtain, in the obtained image, information on the distance to the object and relative speed information with respect to the object based on a change in the object size over time. As another example, the vehicle control unit 1200 can obtain via, for example, a pinhole model and a road surface profiling, information on the distance to the object and relative speed information with respect to the object.

In addition, the vehicle control unit 1200 can detect and track an object based on the reflected electromagnetic wave in which the transmitted electromagnetic wave is reflected and returned by the object. Further, the vehicle control unit 1200 can perform operations such as calculating a distance to the object and calculating a relative speed with respect to the object based on electromagnetic waves. The vehicle control unit 1200 can also detect and track an object based on the reflected laser light in which the transmitted laser light is reflected and returned by the object. In addition, the vehicle control unit 1200 can perform operations such as calculating a distance to the object and calculating a relative speed with respect to the object based on the laser light.

Further, the vehicle control unit 1200 can detect and track an object based on the reflected ultrasonic wave in which the transmitted ultrasonic wave is reflected and returned by the object. The vehicle control unit 1200 can also perform operations such as calculating a distance to the object and calculating a relative speed with respect to the object based on the ultrasonic wave.

In addition, the vehicle control unit 1200 can detect and track an object based on the reflected infrared light in which the transmitted infrared light is reflected and returned by the object, and can also perform operations such as calculating a distance to the object and calculating a relative speed with respect to the object based on the infrared light.

According to an embodiment, the object detection unit 1400 may include a separate processor from the vehicle control unit 1200. In addition, the radar, lidar, ultrasonic sensor, and infrared sensor each may include a processor individually. When a processor is included in the object detection unit 1400, the object detection unit 1400 can be operated under the control of the processor that is under the control of the vehicle control unit 1200.

In addition, the imaging unit 1500 can be located at an appropriate position on the exterior of the vehicle to obtain an image of the outside of the vehicle. The imaging unit 1500 may be a mono camera, a stereo camera, an around view monitoring (AVM) camera, or a 360-degree camera. The imaging unit 1500 may include a camera mounted on the vehicle 1000, such as a camera mounted in a black box. In more detail, the imaging unit 1500 can also capture an image of the surroundings of the vehicle 1000 by using the camera mounted on the vehicle 1000 and provide the captured image to the vehicle control unit (controller, processor) 1200. The imaging unit 1500 can also provide an image for operation of the object detection unit 1400.

Further, the imaging unit 1500 can obtain an image including another vehicle. In this instance, the vehicle control unit 1200 may determine that a black box mounted on another vehicle including a license plate in the image including the another vehicle is an external black box to be communicated via the vehicle communication unit 1100.

The vehicle control unit 1200 can receive a plurality of images from the imaging unit 1500 while the vehicle 1000 is moving to the parking lot to extract the identification information indicated on the immovable objects in the plurality of images. The imaging unit 1500 can obtain the information on the position of the object, the information on the distance to the object, or the relative speed information with respect to the object by using various image processing algorithms.

In addition, the imaging unit 1500 can obtain the information on the distance to the object and the relative speed information with respect to the object based on variations of the object size over time in the obtained image. The imaging unit 1500 can also obtain, via, for example a pinhole model and a road surface profiling, the information on the distance to the object and the relative speed information with respect to the object.

Also, the imaging unit 1500 can obtain the information on the distance to the object and the relative speed information with respect to the object based on disparity information in a stereo image obtained from the stereo camera. Further, the imaging unit 1500 may be disposed close to a front windshield in the interior of the vehicle to obtain an image of the front of the vehicle. Alternatively, the imaging unit 1500 may be disposed near a front bumper or a radiator grill.

Also, the imaging unit 1500 may be disposed close to a rear window in the interior of the vehicle to obtain an image of the rear of the vehicle and may be disposed near a rear bumper, a trunk, or a tailgate. The imaging unit 1500 may also be disposed close to at least one of side windows in the interior of the vehicle to obtain an image of the side of the vehicle. Alternatively, the imaging unit 1500 may be disposed near a side mirror, a fender, or a door. Thus, the imaging unit 1500 can provide an obtained image to the vehicle control unit 1200.

In more detail, the vehicle control unit 1200 can obtain the information on the distance to the object and the relative speed information with respect to the object based on the disparity information in the stereo image obtained from the stereo camera of the imaging unit 1500.

In addition, the sensing unit 1600 can sense a state of the vehicle 1000, that is, detect the state of the vehicle 1000 using a sensor mounted on the vehicle 1000 and obtain movement route information of the vehicle 1000 according to the sensed signal. The sensing unit 1600 can then provide the obtained movement route information to the vehicle control unit 1200.

The sensing unit 1600 may include, for example, an attitude sensor such as a yaw sensor, a roll sensor and a pitch sensor, an impact sensor, a wheel sensor, a speed sensor, an incline sensor, a weight sensing sensor, a heading sensor, a gyro sensor, a position module, a vehicle forward and reverse sensor, a battery sensor, a fuel sensor, a tire sensor, a steering sensor by means of a steering wheel, a vehicle internal temperature sensor, a vehicle internal humidity sensor, an ultrasonic sensor, an luminance sensor, an accelerator pedal position sensor, and a brake pedal position sensor.

The sensing unit 1600 can also obtain vehicle attitude information, vehicle impact information, vehicle direction information, vehicle position information (GPS information), vehicle angle information, vehicle speed information, vehicle acceleration information, vehicle tilt information, vehicle forward and reverse information, battery information, fuel information, tire information, vehicle lamp information, vehicle internal temperature information, vehicle internal humidity information, and sensing signals such as a steering wheel rotation angle, vehicle exterior illumination, pressure applied to an accelerator pedal, and pressure applied to a brake pedal.

The sensing unit 1600 may further include, for example, an accelerator pedal sensor, a pressure sensor, an engine speed sensor, an air flow sensor (AFS), an intake air temperature sensor (ATS), a water temperature sensor (WTS), a throttle position sensor (TPS), a TDC sensor, and a crank angle sensor (CAS). The sensing unit 1600 can generate the vehicle state information based on the sensing data. The vehicle state information may be information generated based on data sensed by various sensors provided inside the vehicle.

In addition, the vehicle state information may include, for example, the vehicle attitude information, the vehicle speed information, the vehicle incline information, the vehicle weight information, the vehicle direction information, the vehicle battery information, the vehicle fuel information, the vehicle tire pressure information, the vehicle steering information, the vehicle indoor temperature information, the vehicle indoor humidity information, the pedal position information, the vehicle engine temperature information.

Also, the operating unit 1700 can control various operations of the vehicle 1000 and be operated in the autonomous driving mode. Further, the operating unit 1700 may include a driving module, an unparking module, and a parking module. According to this embodiment, the operating unit 1700 may include other components than those described below, or may not include some of the components described below.

In addition, the operating unit 1700 may include a processor under the control of the vehicle control unit 1200. Each module of the operating unit 1700 may include a processor individually. According to an embodiment, when the operating unit 1700 is implemented in software, it may be a sub-concept of the vehicle control unit 1200.

In addition, the driving module can perform driving of the vehicle 1000. The driving module can also receive the object information from the object detection unit 1400 and provide a control signal to the vehicle drive module to perform the driving of the vehicle 1000. Further, the driving module can receive a signal from an external device via the vehicle communication unit 1100 and provide a control signal to the vehicle drive module to perform the driving of the vehicle 1000.

The unparking module can perform the unparking of the vehicle 1000, can receive navigation information from the navigation unit 1800 and provide a control signal to the vehicle drive module to perform the unparking of the vehicle 1000. Further, the unparking module can receive a signal from an external device via the vehicle communication unit 1100 and provide a control signal to the vehicle drive module to perform unparking of the vehicle 1000.

The parking module can also perform parking of the vehicle 1000. The parking module can receive navigation information from the navigation unit 1800 and provide a control signal to the vehicle drive module to perform parking of the vehicle 1000.

Further, the parking module can receive the object information from the object detection unit 1400 and provide a control signal to the vehicle drive module to perform parking of the vehicle 1000. The parking module can also receive a signal from an external device via the vehicle communication unit 1100 and provide a control signal to the vehicle drive module to perform parking of the vehicle 1000.

In addition, the navigation unit 1800 can provide navigation information to the vehicle control unit 1200. The navigation information may include at least one of map information, set destination information, route information according to the destination setting, information about various objects on the route, lane information, or current information on the position of the vehicle.

The navigation unit 1800 can also provide the vehicle control unit 1200 with the map of the parking lot in which the vehicle 1000 enters. When the vehicle 1000 enters the parking lot, the vehicle control unit 1200 receives the parking lot map from the navigation unit 1800 and projects a calculated movement route and identification information of the immovable object on the provided parking lot map to generate map data.

The navigation unit 1800 may include memory that stores navigation information. The navigation information can also be updated by information received via the vehicle communication unit 1100. The navigation unit 1800 can be controlled by a built-in processor or an external signal, for example, by receiving a control signal from the vehicle control unit 1200, but the present disclosure is not limited thereto. The operating module of the operating unit 1700 can also receive the navigation information from the navigation unit 1800 and provide a control signal to the vehicle drive module to perform the driving of the vehicle 1000.

Further, the vehicle storage unit 1900 can be electrically connected to the vehicle control unit 1200 and store basic data for each part of the parking position notification apparatus, control data for controlling operations of each part of the parking position notification apparatus, and input and output data. For example, the vehicle storage unit 1900 may be, in hardware, various storage devices such as a ROM, a RAM, an EPROM, a flash drive, and a hard drive. The vehicle storage unit 1900 can also store various data for all operations of the vehicle 1000, such as a program for processing or controlling the vehicle control unit 1200. In this instance, the vehicle storage unit 1900 may be formed integrally with the vehicle control unit 1200 or may be implemented as a sub-component of the vehicle control unit 1200.

Figure 3:
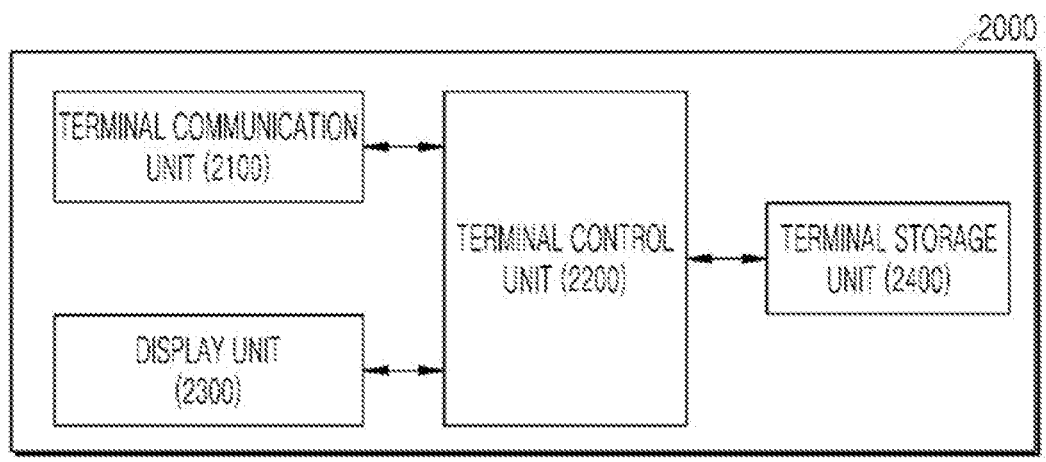
FIG. 3 is a block diagram illustrating a parking position notification apparatus installed in a user terminal according to an embodiment of the present disclosure.

In addition, the parking position notification apparatus shown in FIG. 3 may be installed in the user terminal 2000 owned by the user of the vehicle in the parking lot. Here, the user terminal 2000 may be a portable device such as a notebook computer, a mobile phone, a personal digital assistant (PDA), a smartphone, and a multimedia device, or may be a non-portable device such as a personal computer (PC) and a vehicle mounted device.

As shown in FIG. 3, the parking position notification apparatus installed on the user terminal 2000 side may include a terminal communication unit 2100, a terminal control unit (controller, processor) 2200, a display unit 2300, and a terminal storage unit 2400. According to this embodiment, the parking position notification apparatus may include other components than those shown in FIG. 3 and described below, or may not include some of the components shown in FIG. 3 and described below.

The terminal communication unit 2100 can receive an image and a signal from the vehicle 1000. As discussed above, the vehicle 1000 may include the imaging unit 1500 for capturing an image of a surrounding area and providing the captured image to the user terminal 2000, and the sensing unit 1600 for sensing a signal associated with the state of the vehicle. The terminal communication unit 2100 may include a position informing module, for receiving a signal including information on the position of the user terminal 2000. The position information unit may include a GPS module or a DGPS module.

In addition, the terminal communication unit 2100 can transmit and receive signals with the vehicle 1000 or the server system 3000 via a mobile communication network. Here, the mobile communication network may be a multiple access system that can support multi-user communication by sharing used system resources, such as bandwidth and transmission power. Examples of the multiple access system may include a CDMA system, a FDMA system, a TDMA system, an OFDMA system, a SC-FDMA system, and a MC-FDMA system.

Further, the terminal control unit 2200 can receive an image via the terminal communication unit 2100 to extract an immovable object from the image, for example, identification information indicated on the parking lot pillar, for instance a number or letter such as A-2, A-3, and B-4, receive a signal associated with the state of the vehicle 1000 via the terminal communication unit 2100 to calculate a movement route after the vehicle 1000 enters the parking lot and use the calculated movement route to determine the parking position of the vehicle 1000, and generate map data including the determined parking position and extracted identification information of the immovable object.

The terminal control unit 2200 can also receive a map of the parking lot in which the vehicle 1000 enters via the terminal communication unit 2100 when the vehicle 1000 enters the parking lot. The terminal control unit 2200 can, for example, generate the map data by projecting the calculated movement route and identification information of the immovable object on the parking lot map.

In addition, the terminal control unit 2200 can generate the shortest route by excluding a repeated route in the movement route after the vehicle 1000 enters the parking lot. Further, the terminal control unit 2200 can generate the map data including the generated shortest route and identification information of the immovable object. Also, the terminal control unit 2200 may be implemented using at least one of ASICs, DSPs, DSPDs, PLDs, FPGAs, processors, controllers, microcontrollers, microprocessors, or electrical units for performing other functions.

In addition, the display unit 2300 can provide information held by the user terminal 2000 to the user under the control of the terminal control unit 2200. The display unit 2300 may be a part of a user interface module including an input unit, an internal camera, and a bio-sensing unit, but is not limited thereto.

The display unit 2300 can also display the map data generated in the terminal control unit 2200 to the user. The display unit 2300 may include at least one of, for example, a liquid crystal display (LCD), a thin film transistor-liquid crystal display (TFT LCD), an organic light-emitting diode (OLED) a flexible display, a 3D display, or an e-ink display. The display unit 2300 may have a mutual layer structure with the touch input module or may be integrally formed to implement a touch screen.

In addition, the terminal storage unit 2400 can be electrically connected to the terminal control unit 2200 and store basic data for each part of the parking position notification apparatus, control data for controlling the operation of each part of the parking position notification apparatus, and input and output data. The terminal storage unit 2400 may be, in hardware, various storage devices such as a ROM, a RAM, an EPROM, a flash drive, and a hard drive. The terminal storage unit 2400 may also store various data for the entire operation of the entire user terminal 2000, such as a program for processing or controlling the terminal control unit 2200. In this instance, the terminal storage unit 2400 may be integrated with the terminal control unit 2200 or may be implemented as a sub-component of the terminal control unit 2200.

Figure 4:
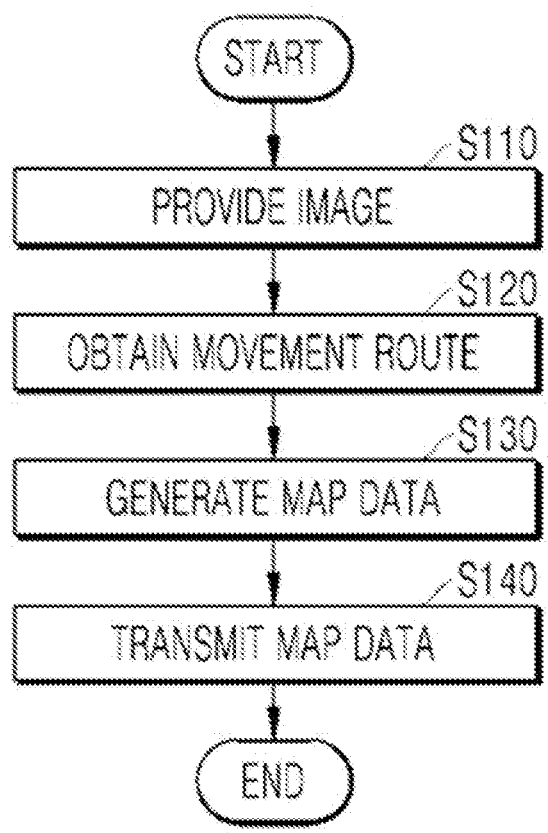
FIG. 4 is a flowchart illustrating an operation of a parking position notification method of a vehicle according to an embodiment of the present disclosure.

Next, FIG. 4 is a flowchart illustrating an operation of a parking position notification method for a vehicle according to an embodiment of the present disclosure. The parking position notification method may include other steps than shown in FIG. 4 and described below, or may not include some of the steps shown in FIG. 4 and described below.

As shown in FIG. 4, the imaging unit 1500 picks up an image of the surroundings of the vehicle 1000 by using the camera mounted on the vehicle 1000 and provides the captured image to the vehicle control unit 1200 in step S110. Further, the sensing unit 1600 senses a signal associated with the state of the vehicle 1000 by using a sensor mounted on the vehicle 1000 and obtains movement route information of the vehicle 1000 according to the sensed signal in step S120.

The vehicle control unit 1200 then receives the image captured from the imaging unit 1500 to extract the identification information indicated on the immovable object in the image and receives the movement route information from the sensing unit 1600 to calculate a movement route after the vehicle 1000 enters the parking lot. In addition, the vehicle control unit 1200 may determine a calculated parking position of the vehicle 1000 using the calculated movement route, and generate map data including the determined parking position and extracted identification information in step S130. The vehicle control unit 1200 can transmit the generated map data to the user terminal 2000 via the vehicle communication unit 1100 in step S140.

Figure 5:
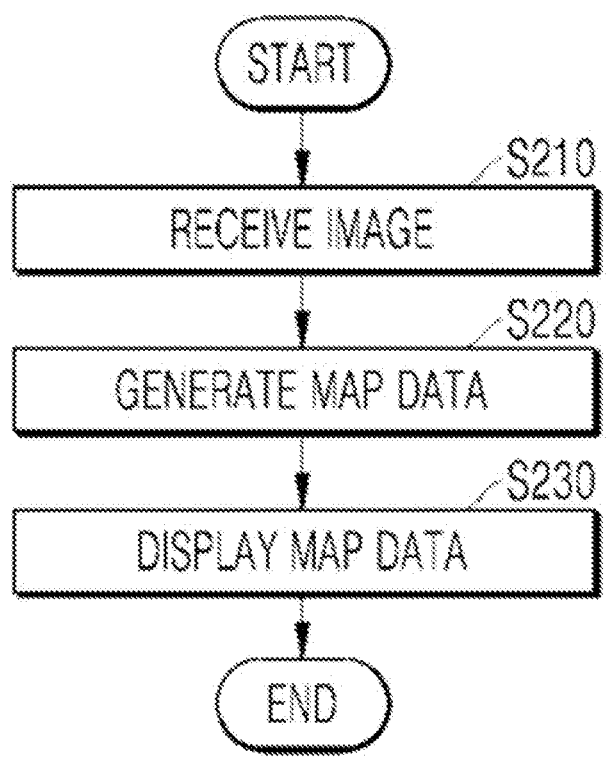
FIG. 5 is a flowchart illustrating an operation of a parking position notification method of a user terminal according to an embodiment of the present disclosure.

Next, FIG. 5 is a flowchart illustrating an operation of a parking position notification method for a user terminal according to an embodiment of the present disclosure. The parking position notification method may include other steps than those shown in FIG. 5 and described below, or may not include some of the steps shown in FIG. 5 and described below.

The terminal communication unit 2100 can receive a signal indicating the state of the vehicle 1000 and an image of the surroundings of the vehicle 1000 captured from a device of the vehicle 1000 in step S210. The terminal control unit 2200 may extract the identification information indicated on the immovable object from the image received from the device of the vehicle 1000. In addition, the terminal control unit 2200 can receive a signal associated with the state of the vehicle 1000 to calculate a movement route and use the calculated movement route to determine a parking position of the vehicle 1000, and generate map data including the determined parking position and extracted identification information after the vehicle 1000 enters the parking lot in step S220. The display unit 230 may display the map data generated by the terminal control unit 2200 in step S230.

Figure 6A:
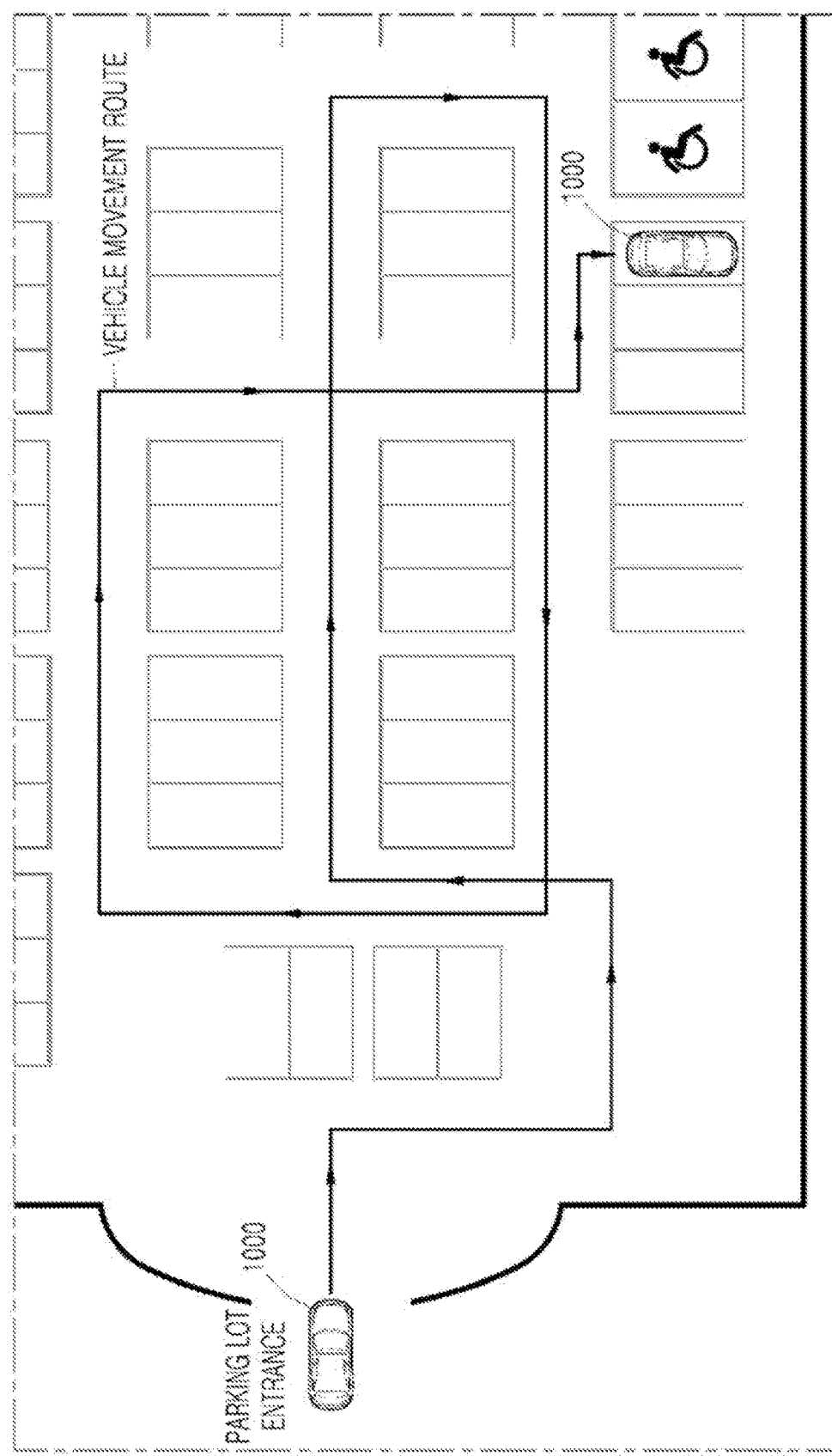
FIG. 6A to FIG. 6C are views for explaining operations of a parking position notification apparatus according to the embodiment of the present disclosure.
Figure 6B:
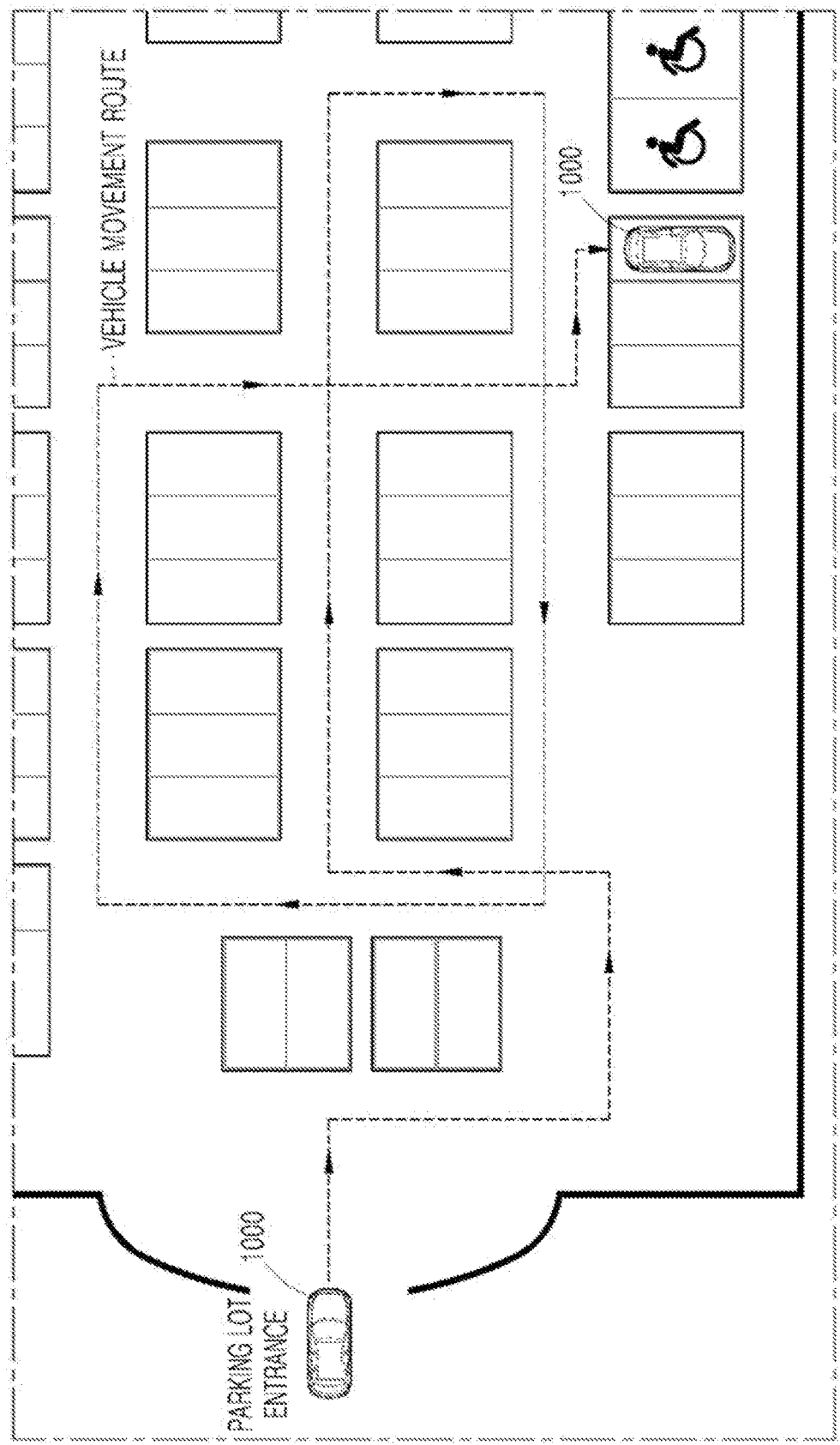
Figure 6C:
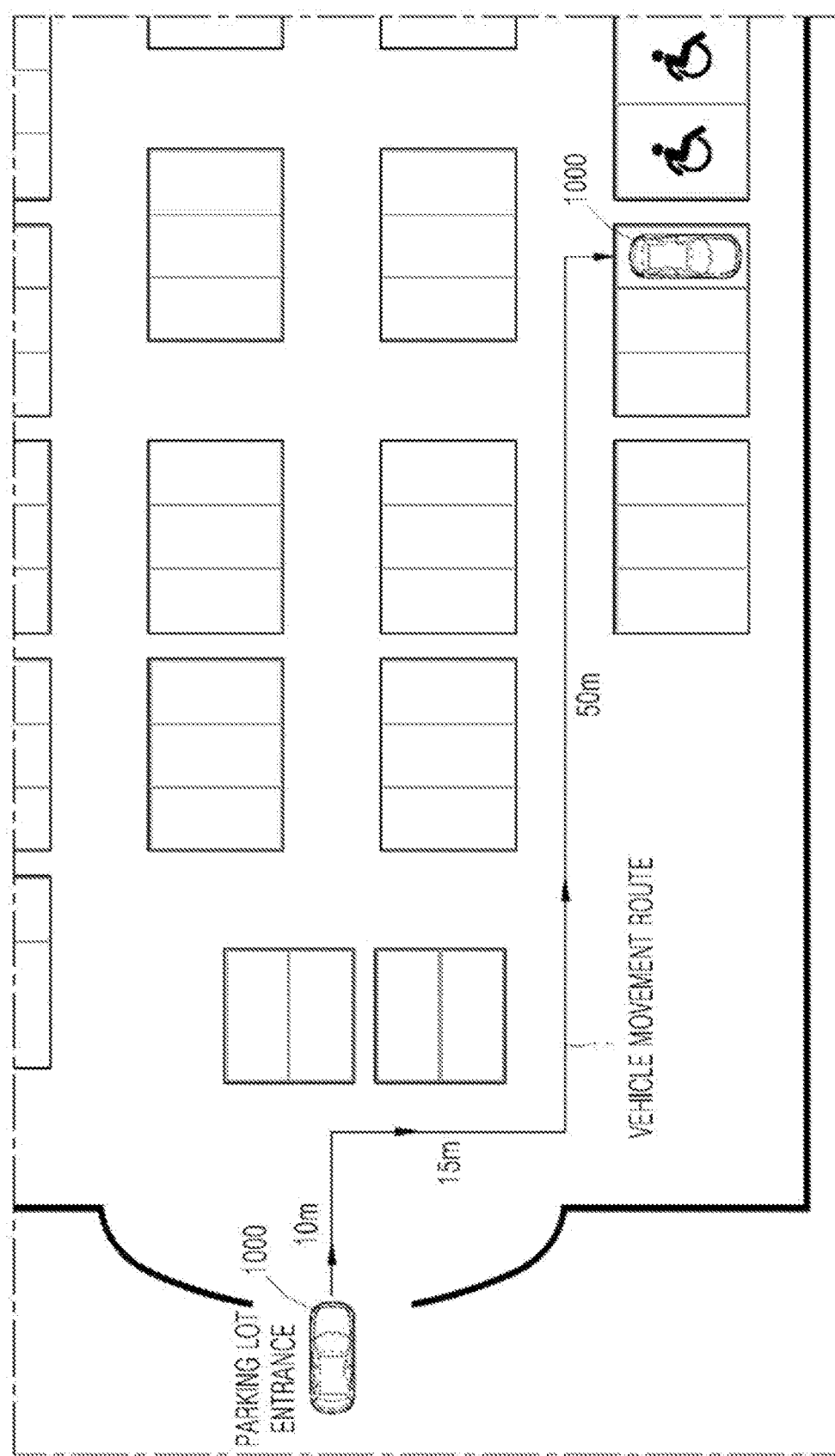

Next, FIG. 6A to FIG. 6C are views for explaining operations of a parking position notification apparatus according to the embodiment of the present disclosure. With reference to FIG. 1 to FIG. 6C, the operation of the parking position notification apparatus according to the embodiment of the present disclosure will be described below.

First, the vehicle control unit 1200 can determine whether the vehicle 1000 enters the inside of a building or a parking lot via the GPS module of the vehicle communication unit 1100. When the vehicle 1000 enters the inside of the building or the parking lot, the vehicle control unit 1200 can sense an entire movement route of the vehicle 1000 (VEHICLE MOVEMENT ROUTE), via the sensing unit 1600, from a time the vehicle passes through the parking lot entrance until a time when parking is completed in a vacant parking space (PARKING COMPLETION). In this instance, the entire movement route sensed by the vehicle control unit 1200 can be stored in the storage unit 1900.

The vehicle control unit 1200 can estimate the parking position (PARKING ESTIMATED POSITION) by projecting the vehicle movement route to a last parking location on the parking lot map information when parking is completed. The vehicle control unit 1200 can sense that the vehicle 1000 is turned off and transmit map data that projects the estimated parking position on the parking lot map, as shown in FIGS. 6A and 6B.

In particular, when the parking lot map is not provided, the vehicle control unit 1200 can sense the entire movement route of the vehicle 1000 from a point where the vehicle enters the inside of the building or the parking lot, that is, a point where the vehicle passes through the parking lot entrance to a point where the parking is completed in the vacant parking space. In addition, the vehicle control unit 1200 can be configured to remove a repeated movement route among the sensed movement routes, that is, a route that is the same or has been used previously to generate the map data in the form of a map indicating the shortest path (for example, turn right after going straight for 10 m, turn left after going straight for 15 m, turn right after going straight for 50 m) connecting the parking lot entrance to the parking location as shown in FIG. 6C.

Figure 7A:
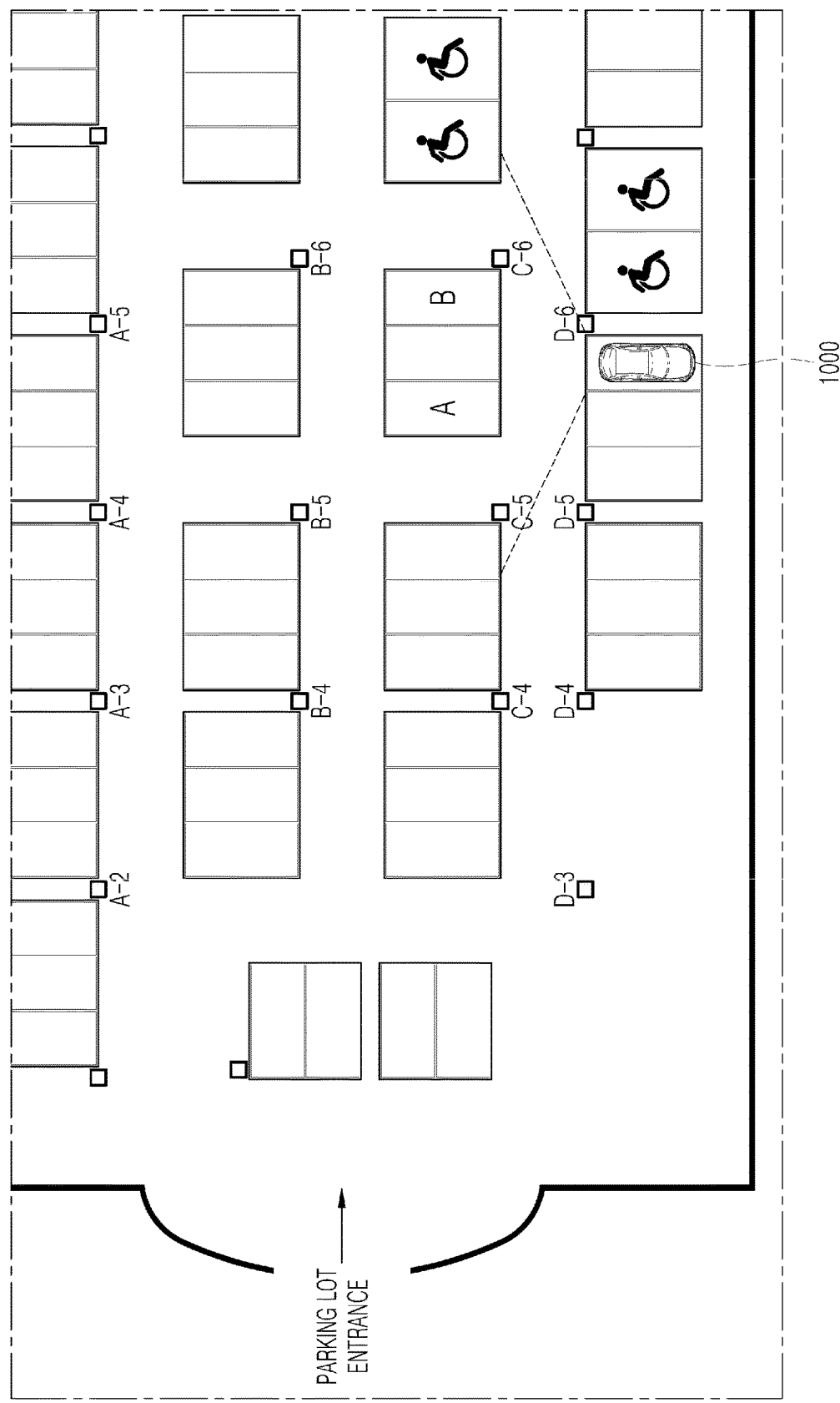
FIG. 7A to FIG. 7C are views for explaining operations of a parking position notification apparatus according to the embodiment of the present disclosure.
Figure 7B:
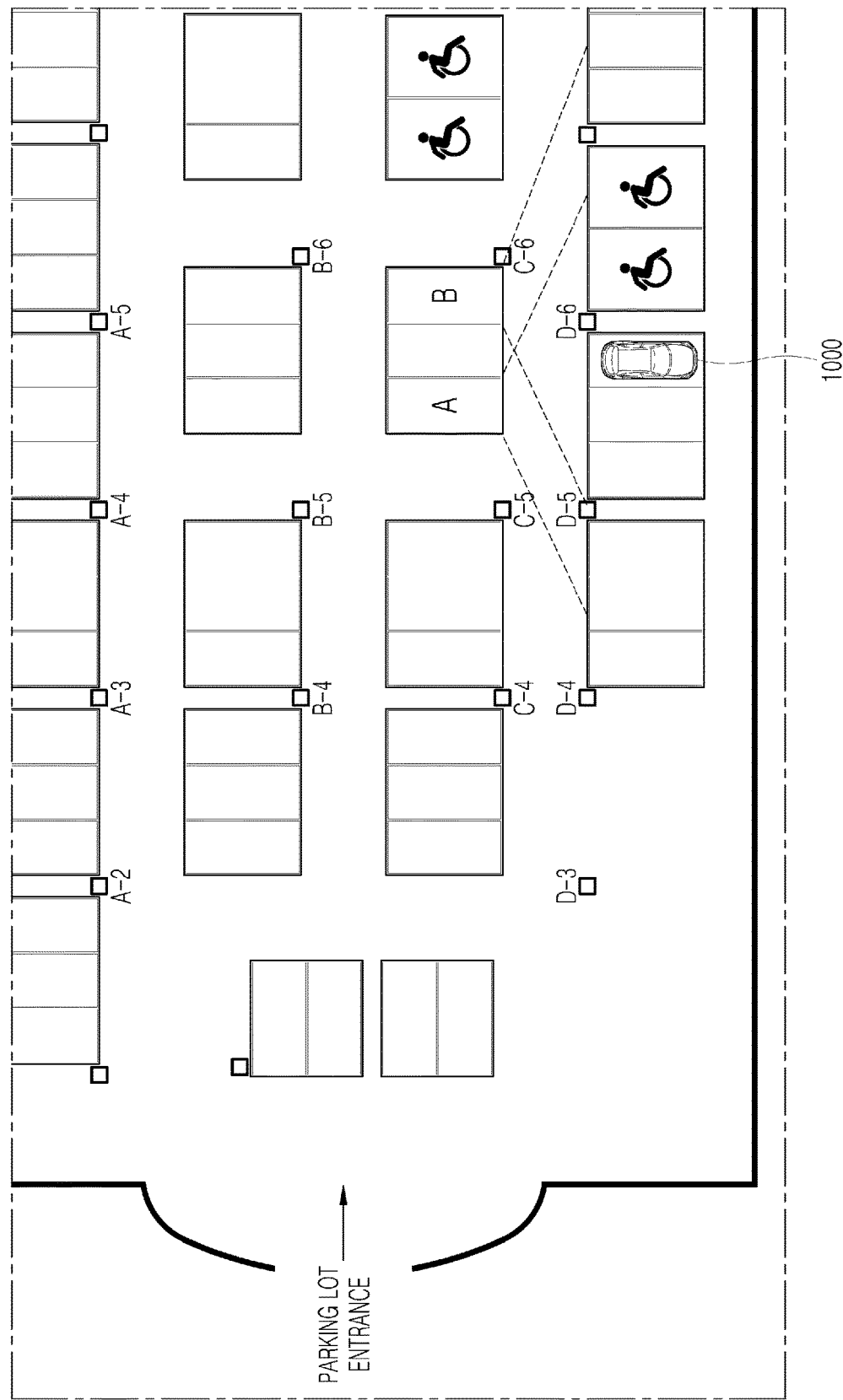
Figure 7C:
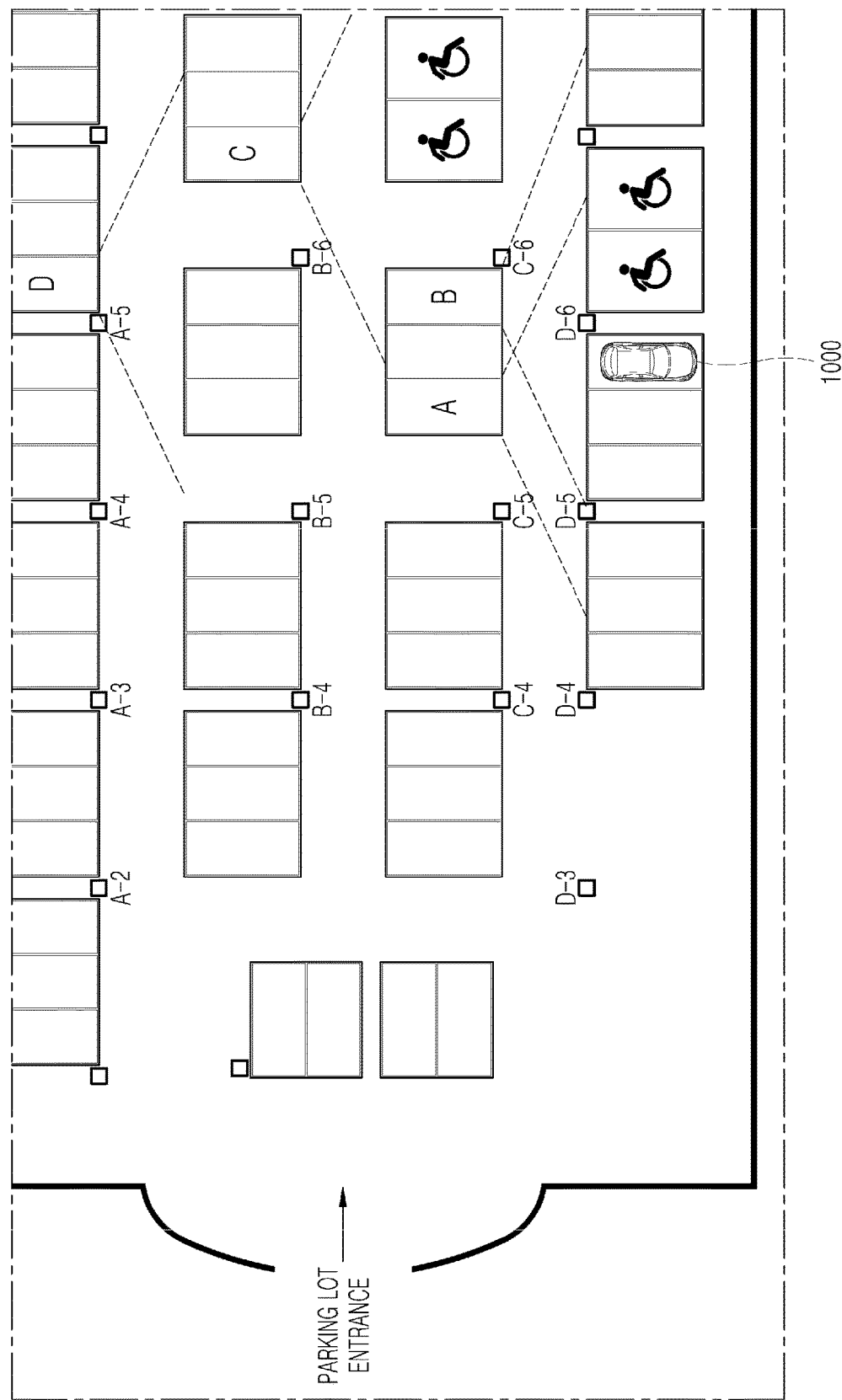

Next, FIG. 7A to FIG. 7C are views for explaining operations of a parking position notification apparatus according to the embodiment of the present disclosure. With reference to FIG. 1 to FIG. 7C, the operation of the parking position notification apparatus according to the embodiment of the present disclosure will be described below.

The vehicle control unit 1200 can obtain an image of the surroundings of the vehicle via the imaging unit 1500 including a camera mounted on the vehicle 1000 as shown in FIG. 7A, for example, a camera mounted on a black box, when the parking is completed, and recognize the license plates of vehicles parked in parking areas A and B near the vehicle and the section numbers C-5 and C-6 indicated on the parking lot pillars in the obtained image of the surroundings of the vehicle.

The vehicle control unit 1200 can then control the vehicle communication unit 1100 to transmit an information exchange request to the vehicles parked in the parking areas A and B near the vehicle 1000 via a local area wireless communication network, as shown in FIG. 7B. Each of the vehicles parked in the parking areas A and B, which receive the information exchange request from the vehicle 1000, can confirm whether the license plate of the vehicle 1000 is included in the image obtained via the camera mounted in the black box. In this instance, when the license plate of the vehicle 1000 is included in the obtained image, each of the vehicles parked in the parking areas A and B can provide the section numbers C-5 and C-6 indicated on the parking lot pillars in the image and the position identification information of the vehicle 1000 to the vehicle 1000.

As shown in FIG. 7C, the vehicles parked in the surrounding parking areas A and B can transmit the information exchange request to a vehicle parked in the surrounding parking area C via the local area wireless network. In addition, the vehicle parked in the surrounding parking area C can transmit the information exchange request to a vehicle parked in the surrounding parking area D via the local area wireless communication network by extending a range of the information exchange request. Each of the vehicles parked in the parking areas C and D, which receive the information exchange request, can confirm whether the license plate of the vehicle requesting the information exchange is included in the image obtained via the camera mounted in the black box. In this instance, when the license plate of the vehicle requesting the information exchange is included in the obtained image, each of the vehicles parked in the parking areas C and D can provide the section numbers indicated on the parking lot pillars in the image and the position identification information of the vehicle to the vehicle 1000.

When extending the range of the information exchange request does not reveal a new vehicle further providing information, the vehicle control unit 1200 can generate map data based on the information collected up to that point. In this instance, the vehicle control unit 1200 can generate the map data via information sharing with the server 3000, rather than sharing information with the surrounding vehicles using the local area communication.

When the parking of the vehicle is completed, the vehicle control unit 1200 can transmit an information sharing request together with the GPS information, the parking position, and the identification information stored via the vehicle communication unit 1100 to the server 3000 when the vehicle enters the parking lot. The server 3000 can transmit parking information received from another vehicle parked in the same parking lot on the GPS information to the vehicle 1000 when receiving the information sharing request from the vehicle 1000. The server 3000 may update information on a state of the parking lot using the parking position and identification information received from the vehicle 1000.

Figure 8A:
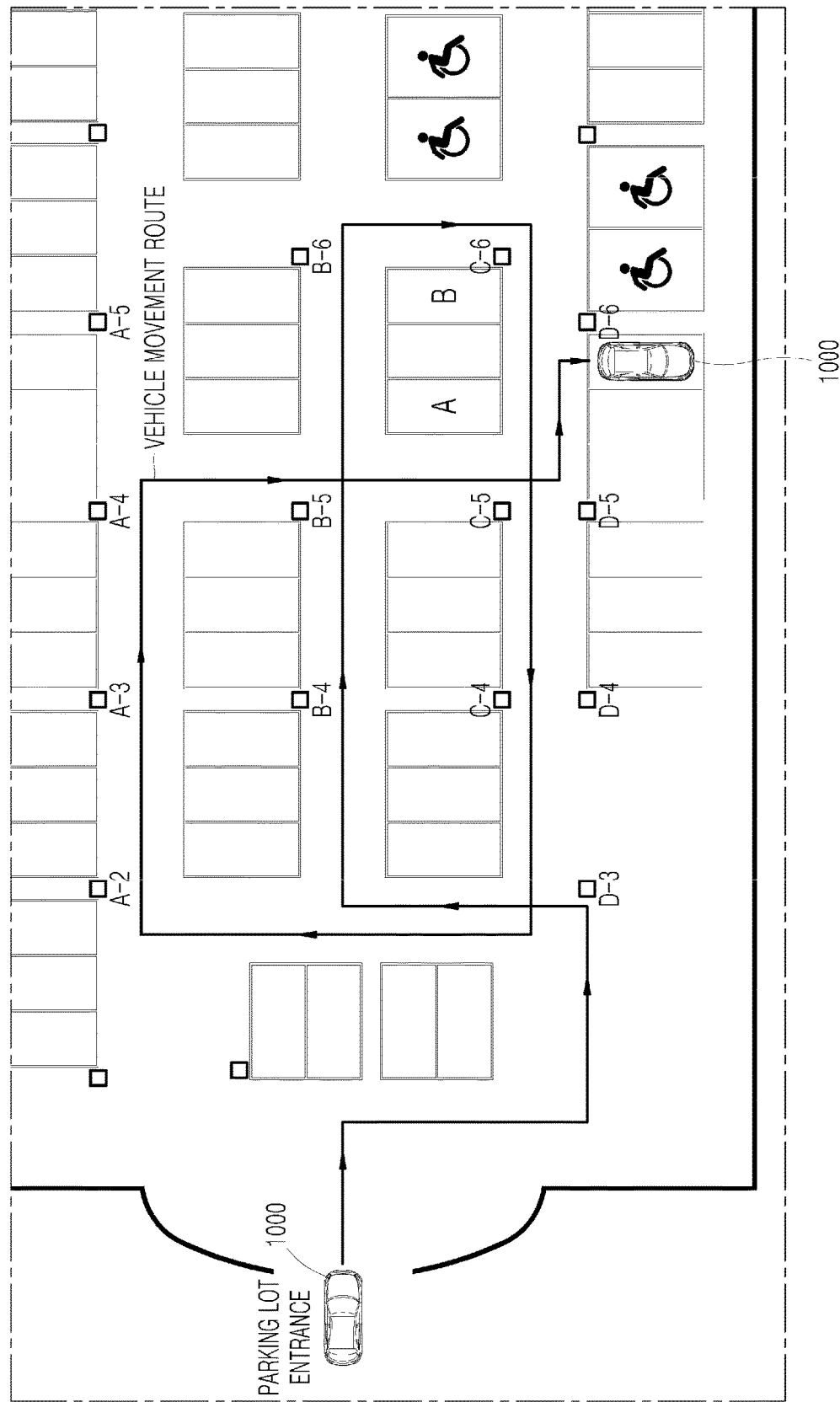
FIG. 8A and FIG. 8B are views for explaining operations of a parking position notification apparatus according to the embodiment of the present disclosure.
Figure 8B:
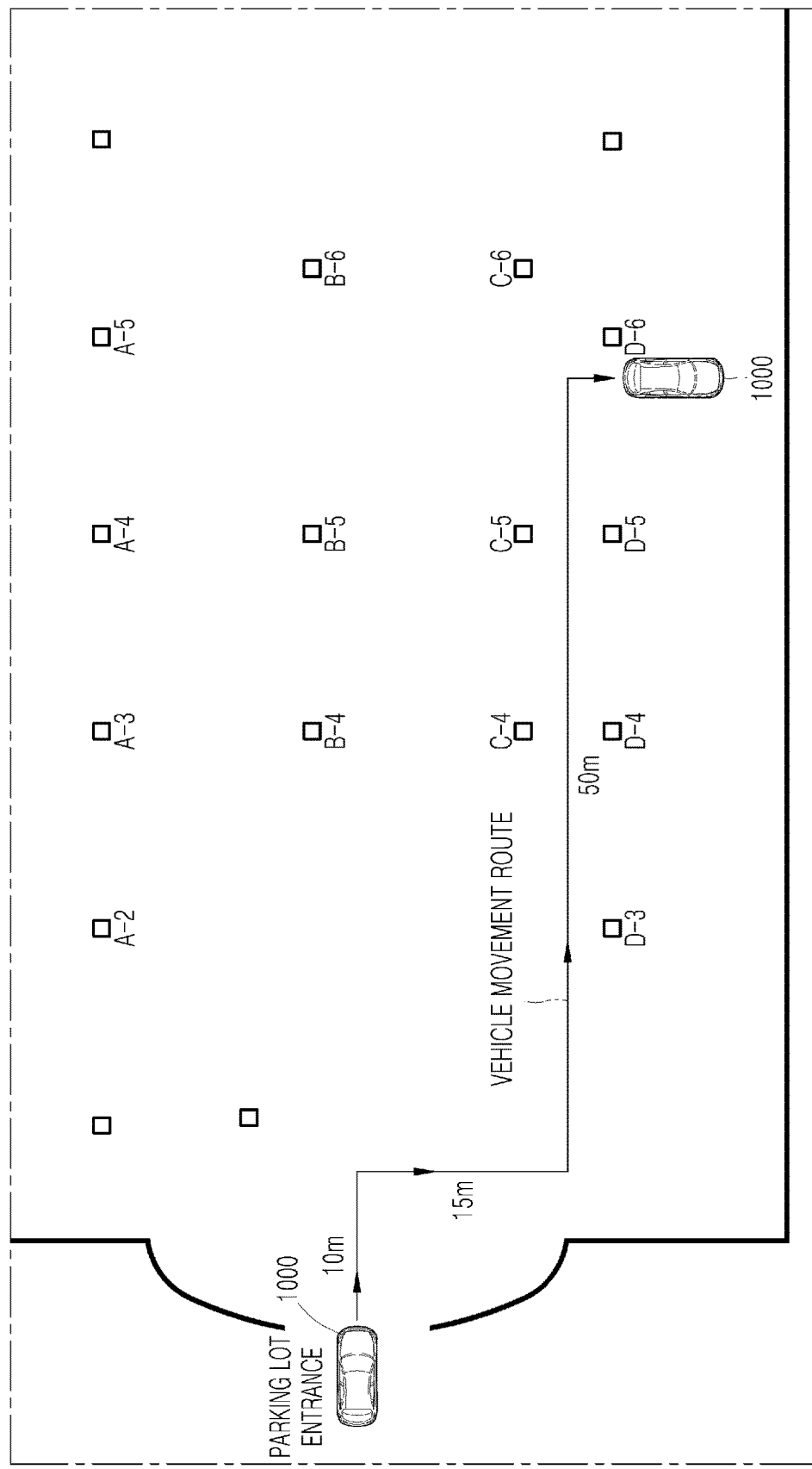

Next, FIG. 8A and FIG. 8B are views for explaining operations of a parking position notification apparatus according to the embodiment of the present disclosure. Referring to FIG. 1 to FIG. 8B, the operation of the parking position notification apparatus according to the embodiment of the present disclosure will be described in detail as follows.

First, as shown in FIG. 8A, the vehicle control unit 1200 can determine whether the vehicle 1000 enters the inside of the building or the parking lot via the GPS module of the vehicle communication unit 1100. When the vehicle 1000 enters the inside of the building or the parking lot, the entire movement route (VEHICLE MOVEMENT ROUTE) of the vehicle 1000 may be sensed, via the sensing unit 1600, from the point of entering the inside of the building or the parking lot, that is, from the point of passing through the entrance of the parking lot to the point when the parking is completed in the vacant parking space (PARKING COMPLETED). The entire sensed movement route may be stored in the storage unit 1900 together with the section numbers (A-2, A-3, A-4, A-5, B-4, B-5, B-6, C-4, C-5, C-6, D-3, D-4, D-5, and D-6) and the pillar positions indicated on the parking lot pillars in the image obtained via the camera mounted in the black box while the vehicle 1000 is moving.

When the parking of the vehicle 1000 is completed, the vehicle control unit 1200 can generate an immovable object map by using the section numbers and pillar positions indicated on the parking lot pillars, and generate map data by projecting the shortest route in which the repeated route is excluded from the vehicle movement route to the final parking location onto the immovable object map. In addition, the vehicle control unit 1200 can detect that the vehicle 1000 is turned off and transmit map data that projects an estimated parking position onto the parking lot map to the user terminal 2000 or the display means, for example, a smartphone, and a key, owned by the user, as shown in FIG. 8B, when the vehicle 1000 is turned off.

In addition, the vehicle control unit 1200 can select a route having the shortest distance in the direction from the parking lot entrance to the parking position among all the movable routes of the vehicle 1000, excluding the repeated route, created using the movement route after the vehicle 100 enters the parking lot as shown in FIG. 8B.

Also, in the route having the shortest distance selected as described above, a section where a past movement direction of the vehicle 1000 does not coincide with a direction leading from the parking entrance to the parking position (for example, a route from D-5 to D-3 in FIG. 8B) may be regarded as one-way traffic. Accordingly, the vehicle control unit 1200 can generate the shortest route excluding the one way section. That is, the vehicle control unit 1200 can also exclude a section in which the past movement direction of the vehicle 1000 and the direction from the parking entrance to the parking position do not coincide with each other when selecting a route as the shortest distance.

According to the embodiments of the present disclosure, even when a user parks a vehicle in a parking lot that is difficult for calculating the parking position by using GPS signals such as an indoor parking lot and a multi-level parking garage, the user can easily find the parking position in various parking lots by providing the user with an accurate parking position using information available from the vehicle itself, such as a movement route and an image.

According to the embodiments of the present disclosure, the user can quickly find the parking position by providing the user with map data indicating the immovable object identification information that may be identified within a short period of time, that is, map data in which, for example, pillar section numbers are indicated with high visibility on parking lot pillars.

The above-described present disclosure may be implemented as a computer-readable code on a medium on which a program is recorded. The computer readable medium includes all kinds of recording devices in which data capable of being read by a computer system is stored. Examples of the computer readable medium include a hard disk drive (HDD), a solid state drive (SSD), a silicon disk drive (SDD), a ROM, a RAM, a CD-ROM, a magnetic tape, a floppy disk, and an optical data storage device, and may also be implemented in the form of a carrier wave, such as transmission over the Internet. In addition, the computer may also include a processor or control unit. Accordingly, the present disclosure described above is not limited by the aspects described herein and accompanying drawings. It should be apparent to those skilled in the art that various substitutions, changes, and modifications which are not exemplified herein but are still within the spirit and scope of the present disclosure may be made. Therefore, the scope of the present disclosure is defined not by the detailed description, but by the claims and their equivalents, and all variations within the scope of the claims and their equivalents are to be construed as being included in the present disclosure.

What is claimed is:

1. A parking position notification apparatus, comprising:
a camera configured to capture an image of surroundings of a vehicle;
a sensor configured to sense movement route information of the vehicle;
a controller configured to:
calculate a movement route after the vehicle enters a parking lot based on the movement route information,
extract identification information indicated on an immovable object of the parking lot in the image,
determine a position of the immovable object in the image and a parking position of the vehicle based on the calculated movement route, and
generate map data including the parking position, the position of the immovable object, and the identification information of the immovable object; and
a wireless communication processor configured to transmit the generated map data to a user terminal,
wherein the controller is further configured to:
identify a position of an external black box,
control the wireless communication processor to communicate with the external black box,
receive a black box image from the external black box,
extract additional identification information on an immovable object in the black box image when a license plate of the vehicle is included in the black box image, and
generate the map data to further include a position of the immovable object in the black box image and the extracted additional identification information.

2. The parking position notification apparatus according to claim 1, wherein the controller is further configured to receive a map of the parking lot via the wireless communication processor when the vehicle enters the parking lot, and
wherein the map data is obtained by projecting the movement route, the position of the immovable object, and the identification information of the immovable object on the map of the parking lot.

3. The parking position notification apparatus according to claim 1, further comprising:
a navigation unit configured to provide a map of the parking lot,
wherein the controller is further configured to receive the map of the parking lot from the navigation unit when the vehicle enters the parking lot, and
wherein the map data is obtained by projecting the movement route, the position of the immovable object, and the identification information of the immovable object on the map of the parking lot.

4. The parking position notification apparatus according to claim 1, wherein the controller is further configured to generate a shortest route by excluding a repeated route in the movement route after the vehicle enters the parking lot, and
wherein the map data includes the shortest route, the position of the immovable object, and the identification information of the immovable object.

5. The parking position notification apparatus according to claim 1, wherein the external black box is a black box mounted on another vehicle.

6. The parking position notification apparatus according to claim 1, wherein the immovable object includes a pillar included in the parking lot.

7. The parking position notification apparatus according to claim 1, wherein the controller is further configured to periodically receive a plurality of images from the camera while moving through the parking lot to extract identification information of immovable objects in the plurality of images.

8. The parking position notification apparatus according to claim 7, wherein the controller is further configured to generate the map data to include positions of the immovable objects identified in the plurality of images and the extracted identification information.

9. The parking position notification apparatus according to claim 1, wherein the vehicle is an autonomous driving vehicle.

10. A method of controlling a parking position notification apparatus, the method comprising:
capturing, via a camera, an image of surroundings of a vehicle;
sensing, via a sensor, movement route information of the vehicle;
calculating, via a controller, a movement route after the vehicle enters a parking lot based on the movement route information;
extracting, via the controller, identification information indicated on an immovable object of the parking lot in the image;
determining, via the controller, a position of the immovable object in the image and a parking position of the vehicle based on the calculated movement route;
generating, via the controller, map data including the parking position, the position of the immovable object, and the identification information of the immovable object; and
transmitting, via a wireless communication processor, the generated map data to a user terminal, wherein the method further comprises:
identifying a position of an external black box;
receiving a black box image from the external black box;
extracting additional identification information on an immovable object in the black box image when a license plate of the vehicle is included in the black box image; and
generating the map data to further include a position of the immovable object in the black box image and the extracted additional identification information.

11. The method according to claim 10, further comprising:
receiving a map of the parking lot via the wireless communication processor when the vehicle enters the parking lot,
wherein the map data is obtained by projecting the movement route, the position of the immovable object, and the identification information of the immovable object on the map of the parking lot.

12. The method according to claim 10, further comprising:
providing a map of the parking lot via a navigation unit; and
receiving the map of the parking lot from the navigation unit when the vehicle enters the parking lot,
wherein the map data is obtained by projecting the movement route, the position of the immovable object, and the identification information of the immovable object on the map of the parking lot.

13. The method according to claim 10, further comprising:
generating a shortest route by excluding a repeated route in the movement route after the vehicle enters the parking lot,
wherein the map data includes the shortest route, the position of the immovable object, and the identification information of the immovable object.

14. The method according to claim 10, wherein the external black box is a black box mounted on another vehicle.

15. The method according to claim 10, wherein the immovable object includes a pillar included in the parking lot.

16. The method according to claim 10, further comprising:
periodically receiving a plurality of images from the camera while moving through the parking lot to extract identification information of immovable objects in the plurality of images; and
generating the map data to include positions of the immovable objects identified in the plurality of images and the extracted identification information.

17. The method according to claim 10, wherein the vehicle is an autonomous driving vehicle.

18. A non-transitory computer-readable recording medium recording a program for notifying a parking position applied to a vehicle, the program causing a computer to perform:
capturing, via a camera, an image of surroundings of a vehicle;
sensing, via a sensor, movement route information of the vehicle;
calculating, via a controller, a movement route after the vehicle enters a parking lot based on the movement route information;
extracting, via the controller, identification information indicated on an immovable object of the parking lot in the image;
determining, via the controller, a position of the immovable object in the image and a parking position of the vehicle based on the calculated movement route;
generating, via the controller, map data including the parking position, the position of the immovable object, and the identification information of the immovable object; and
transmitting, via a wireless communication processor, the generated map data to a user terminal,
wherein the program causes the computer to further perform:
identifying a position of an external black box;
receiving a black box image from the external black box;
extracting additional identification information on an immovable object in the black box image when a license plate of the vehicle is included in the black box image; and
generating the map data to further include a position of the immovable object in the black box image and the extracted additional identification information.

* * * * *